United States Patent
Ohmura et al.

(10) Patent No.: US 6,937,732 B2
(45) Date of Patent: Aug. 30, 2005

(54) AUDIO SYSTEM AND ITS CONTENTS REPRODUCTION METHOD, AUDIO APPARATUS FOR A VEHICLE AND ITS CONTENTS REPRODUCTION METHOD, PORTABLE AUDIO APPARATUS, COMPUTER PROGRAM PRODUCT AND COMPUTER-READABLE STORAGE MEDIUM

(75) Inventors: Hiroshi Ohmura, Hiroshima-ken (JP); Masao Ushio, Hiroshima-ken (JP); Kouji Hosoda, Hiroshima-ken (JP); Shigefumi Hirabayashi, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 924 days.

(21) Appl. No.: 09/825,447

(22) Filed: Apr. 4, 2001

(65) Prior Publication Data

US 2001/0048749 A1 Dec. 6, 2001

(30) Foreign Application Priority Data

Apr. 7, 2000 (JP) ........................ 2000-106892
Apr. 11, 2000 (JP) ........................ 2000-108853

(51) Int. Cl.$^7$ ................................ H04B 1/00
(52) U.S. Cl. ................. 381/86; 455/345; 455/346
(58) Field of Search ................ 381/86, 79; 455/345, 455/346, 569.2, 556.1, 99, 149, 150.1, 151.2, 151.4, 152.1

(56) References Cited

U.S. PATENT DOCUMENTS

| | | | |
|---|---|---|---|
| 5,319,716 A | * | 6/1994 | McGreevy .................. 455/345 |
| 5,862,235 A | | 1/1999 | Kowalczyk |
| 5,970,390 A | | 10/1999 | Koga et al. |
| 6,052,603 A | * | 4/2000 | Kinzalow et al. ......... 455/569.2 |
| 6,407,750 B1 | * | 6/2002 | Gioscia et al. ................ 381/86 |
| 6,493,546 B2 | * | 12/2002 | Patsiokas .................... 455/345 |
| 6,829,475 B1 | * | 12/2004 | Lee et al. .................... 455/345 |

FOREIGN PATENT DOCUMENTS

| | | |
|---|---|---|
| EP | 0 833 336 A1 | 4/1998 |
| JP | 10-240207 | 9/1998 |
| JP | 11-030986 | 2/1999 |
| WO | WO 87/01252 | 2/1987 |
| WO | WO 94/10761 | 5/1994 |
| WO | WO 95/33319 | 12/1995 |

* cited by examiner

Primary Examiner—Stella Woo

(57) ABSTRACT

An audio apparatus for a vehicle made up of a car-mounted audio apparatus 100 and portable audio apparatuses 200a and 200b transmits/receives contents data such as music via radio communication. As a communication system for this in-car radio communication, a short-distance data communication system is used, which allows the apparatuses to recognize and authenticate one another and perform data communication with one another in the vehicle. Received music data is reproduced/output in real time.

19 Claims, 25 Drawing Sheets

F I G. 13
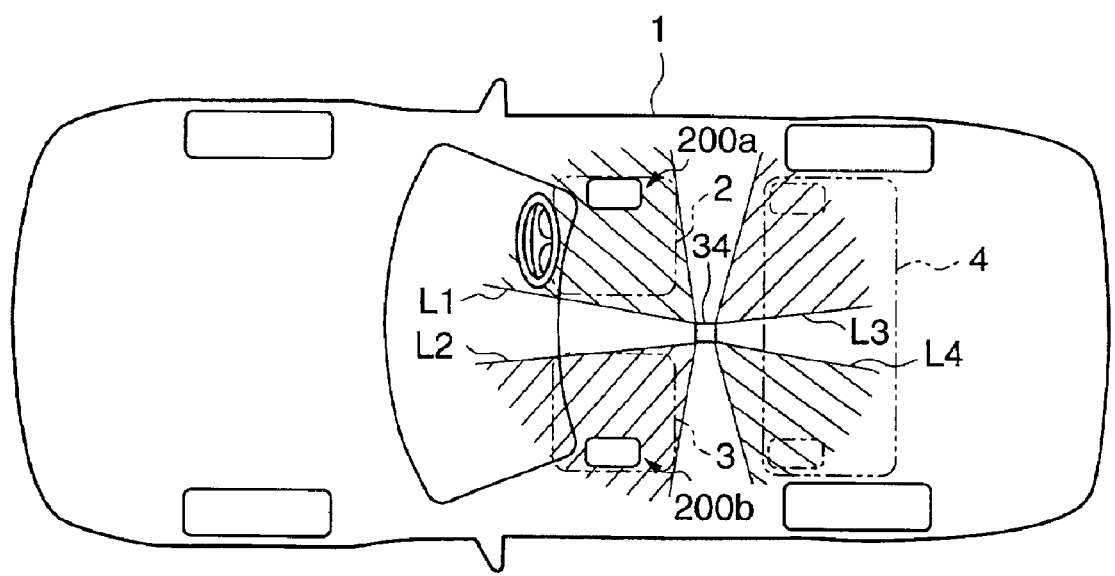

AUDIO SYSTEM AND ITS CONTENTS REPRODUCTION METHOD, AUDIO APPARATUS FOR A VEHICLE AND ITS CONTENTS REPRODUCTION METHOD, PORTABLE AUDIO APPARATUS, COMPUTER PROGRAM PRODUCT AND COMPUTER-READABLE STORAGE MEDIUM

FIELD OF THE INVENTION

The present invention relates to the field of an audio apparatus that provides contents such as music in a vehicle such as an automobile.

BACKGROUND OF THE INVENTION

In the field of an automobile, a typical example of vehicle, an audio apparatus has come into widespread use in recent years allowing passengers to enjoy various contents such as music in a vehicle.

In such a conventional audio apparatus, a passenger inserts a portable music storage medium such as a CD (compact disk), MD (mini-disk), cassette tape into the audio apparatus and enjoys music of his/her choice by replaying/outputting it from data stored in the music storage medium.

However, an audio apparatus using such a music storage medium is burdensome because the passenger needs to take the storage medium storing music to be replayed in the vehicle into the vehicle every time the passenger gets on the vehicle.

Thus, the Japanese Patent Laid-Open No. 11-30986, etc. proposes a technology for directly receiving digitized music data from the outside through an audio apparatus using a music distribution service and enjoying the music data in the vehicle without using a music recording medium.

Here, the technology described in the Japanese Patent Laid-Open No. 11-30986 will be summarized below.

The vehicle music data acquisition system described in this Publication consists of an information center that distributes music to vehicles and a vehicle capable of wirelessly communicating with the information center (see FIG. 2 of the relevant Publication) and the music distribution procedure in such a system configuration is explained with reference to FIG. 2 of the relevant Publication.

That is, the vehicle sends data about a music replaying condition in the own vehicle (including information to identify music of a distribution request) to the information center.

Upon reception of the data about the music replaying condition, the information center determines whether the requested music data exists in the information center or not and if the music data does not exist, the information center acquires the data on the Internet from the outside. Then, the information center creates music data with the amount of data reduced (compressed) based on the data about the music replaying condition and sends the music data created to the vehicle. The vehicle replays the music based on the received music data.

According to the audio apparatus using this music distribution service, the passenger can enjoy any music at any time without the need to prepare any music storage medium. This allows the passenger to easily enjoy music of his/her choice in the vehicle, providing an effect of allowing the passenger to spend his/her time comfortably in the vehicle.

Furthermore, the technology described in the Japanese Patent Laid-Open No. 10-240207 will be summarized below.

This Publication describes a touch-screen type audio-visual replay digital system and a plurality of windows appearing on a display shows information on audio-visual contents that can be replayed.

The user can select a desired window from among a plurality of windows displayed to easily replay the audio-visual contents requested to be replayed.

On the other hand, recently, with the development of the Internet, music distribution services indirectly using the Internet are provided as described below, which allows the user to download digitized contents data such as music to an information storage medium such as a memory card and enjoy music of his/her choice easily.

Furthermore, recently, individuals often carry with them portable audio apparatuses and these portable audio apparatuses are also making it easier to enjoy music using music data stored in an information storage medium.

By the way, people go for a long-distance drive on a trip, etc., a plurality of passengers often gets on the vehicle, in which case, because preference of music varies from one person to another, it is preferred that these passengers be able to enjoy music of their respective choices and spend their time during the long-distance drive comfortably.

In a vehicle equipped with an audio apparatus using a conventional music storage medium, satisfying such as demand requires each passenger to record music of his/her choice to a music storage medium corresponding to the audio apparatus or purchase one and take the music storage medium into the vehicle.

As in the case of the Japanese Patent Laid-Open No. 11-30986, the audio apparatus using the music distribution service provided from the information center can freely obtain a variety of music data at any time by a required amount. This allows the passengers to freely enjoy music of their choice without the need to take the music storage medium into the vehicle.

The audio apparatus using the music distribution service provides such convenience, but on the other hand, because this audio apparatus receives music data from the outside by radio (wireless telephone line, etc.), it takes some time of communication to download music data of one piece of music for example. Therefore, if, for example, electromagnetic interference occurs while the music data is being downloaded during a drive, the audio apparatus is unable to reliably receive the music data of the relevant piece of music.

And in the case where the music data cannot be received reliably, it is necessary to receive the music data again. Thus, even the audio apparatus using the music distribution service is still not sufficient in respect of user friendliness.

Moreover, downloading music data from the music distribution service in the current communication environment entails a high communication cost, and so it is problematic in respect of cost, too.

Therefore, one possible method of enjoying music of one's choice reliably and at low cost without using such a music distribution service is to use music data included in a portable audio apparatus. This is because the portable audio apparatus that each passenger carries includes music data of his/her choice beforehand and using this music data allows the passenger to reliably enjoy music data of his/her choice in the vehicle.

However, the shape and mode of a portable audio apparatus varies from one model to another, and the wired connection port and the shape of its information storage medium also vary. For this reason, using this portable audio apparatus in the vehicle requires the passenger to set the audio apparatus in a mount pre-installed in the vehicle, connect it to an in-car audio apparatus via a cable or insert or remove the information storage medium to take the music data of portable audio apparatuses of all models into the in-car audio apparatus, which is difficult in practice.

Moreover, even if wired connection ports of portable audio apparatuses of all models and information storage media are standardized having a common shape and mode, there remains a possibility that the passenger will still need to set the audio apparatus in the mount and insert or remove the information storage media, which is a problem of requiring time and trouble.

Moreover, the conventional audio system above generally comprises a main unit that controls reproduction of musical pieces (contents) connected to a plurality of speakers via cables. Therefore, when an audio system is also mounted when the vehicle is purchased or when a desired audio system is mounted later, it is troublesome to lay cables for the audio system in a limited space of the vehicle.

Furthermore, also in the car cabin design stage, the degree of freedom in design may be reduced because it is necessary to consider locations of cables for the audio system and operability for cabling, etc.

Furthermore, in a conventional audio system, once a determined system configuration has been incorporated in the vehicle, subsequent changes to the system configuration are not easy. Thus, when the user wants to replay a CD (compact disk) in the main unit that is provided with only functions of a radio tuner and cassette tape recorder, a widespread method for meeting such a demand is to carry into the vehicle a portable CD player, a transmitter that FM-modulates an output signal and allows a radio tuner on the audio system side to receive the output signal or an adapter that reads the output signal of the CD player through the head of the cassette tape recorder and thereby indirectly reproduces the output signal of the CD player through the audio system.

However, the above indirect reproduction method requires that a portable CD player and FM transmitter, etc. be carried into the vehicle and their locations be secured in a narrow car cabin, and restricts the original seating space for passengers, provides not good looking and also has a problem with the quality of musical pieces.

SUMMARY OF THE INVENTION

The present invention has been proposed to solve the conventional problems, and has as its main object to provide, even when a plurality of passengers gets on an automobile, for example, an audio system and its contents reproduction method, audio apparatus for a vehicle and its contents reproduction method, portable audio apparatus, computer program product and computer-readable storage medium capable of easily and reliably reproducing contents data in a portable audio apparatus carried by passengers inside the vehicle and outputting the contents data as sound so that passengers can enjoy music of their respective choices in the vehicle without the need to download contents data such as music and conversation from the Internet.

To solve the above problems, the present invention is constituted as follows.

That is, the present invention provides an audio system that reproduces contents information as sound in a vehicle, composed of portable audio apparatuses (200, 200a, 200b) carried by passengers of the vehicle and an audio apparatus (100) mounted in the vehicle, characterized in that the portable audio apparatuses include contents information retaining means (204) for retaining contents information and transmitting means (205) for transmitting the contents information to the audio apparatus at least by means of radio communication, and the audio apparatus includes receiving means (110) for receiving the contents information from the portable audio apparatuses at least by means of radio communication, and controlling means (101, 103) for reproducing the contents information received by the receiving means and at the same time outputting the reproduced information as sound from speakers(28) mounted in the vehicle.

In a preferred embodiment, it is preferred that the audio apparatus be provided with operation switches (24, 106–109) that allow entries by the passengers of the vehicle, operation signal transmitting means (110) for transmitting operation signals according to the operations of the operation switches to the portable audio apparatuses at least by means of radio communication, and the portable audio apparatuses be further provided with controlling means (203) for performing own operation control according to the operation signals received from the audio apparatus at least by means of radio communication.

Furthermore, for example, the audio apparatus (100) mounted in the vehicle constructs a radio subsystem made up of audio controlling means (100A) equipped with a first radio communication apparatus (116) and speaker units (2A to 2D) equipped with a second radio communication apparatus (222), and the first and second radio communication apparatuses can perform radio communications based on a predetermined radio communication protocol, and it is preferred that the plurality of speaker units receive radio signals transmitted from the first radio communication apparatus of the audio controlling means by the second radio communication apparatus and reproduce the contents information contained in the received radio signals according to characteristic information individually set in each speaker unit.

To attain the same object, the present invention provides a contents reproduction method for an audio system that reproduces contents information as sound in the vehicle, comprising a system constructing step of constructing a communication system that carries out at least a radio communication, composed of portable audio apparatuses (200, 200a, 200b) carried by passengers of the vehicle and an audio apparatus (100) mounted in the vehicle, a contents information sending step of sending contents information retained beforehand in the portable audio apparatuses to the audio apparatus at least by means of radio communication, and a sound reproducing step of receiving and reproducing the contents information sent in the contents information sending step at least by means of radio communication and outputting the reproduced information as sound from speakers (28) mounted in the vehicle.

Furthermore, for example, the system constructing step includes a subsystem constructing step of constructing a radio subsystem made up of an audio control unit (10A) equipped with a radio communication apparatus that can perform radio communication based on a predetermined radio communication protocol and a plurality of speaker units (2A to 2D), and it is preferred that the audio reproducing step includes a first step of sending a radio signal containing contents information from the audio control unit and the plurality of speaker units include a second step of receiving the radio signals and reproducing the contents information included in the received radio signal as sound according to characteristic information individually set in each speaker unit.

To attain the same object, the present invention provides an audio apparatus for a vehicle (100) mounted in a vehicle to reproduce contents information as sound in the vehicle, comprising system constructing means (101, 110) for constructing a radio communication system composed of portable audio apparatuses (200, 200a, 200b) carried by passengers of the vehicle and the audio apparatus, receiving means (110) for receiving the contents information from the portable audio apparatuses at least by means of radio communication and controlling means (101, 103) for reproducing the contents information received by the receiving means and outputting the reproduced information as sound from speakers (28) mounted in the vehicle.

In a preferred embodiment, it is preferred that the system constructing means, when the plurality of portable audio apparatuses is identified, construct a radio communication system including the plurality of portable audio apparatuses and the controlling means control so that between the plurality of portable audio apparatuses, the contents information retained beforehand by the first portable audio apparatus is transferred to the second portable audio apparatus by radio communication and the contents information is reproduced as sound by the second portable audio apparatus.

Another method to attain the same object is a contents reproduction method for an audio apparatus for a vehicle (100) mounted in a vehicle that reproduces contents information as sound in the vehicle, comprising a system constructing step of constructing a radio communication system composed of portable audio apparatuses (200, 200a, 200b) carried by passengers of the vehicle and the audio apparatus, a receiving step of receiving the contents information from the portable audio apparatuses at least by means of radio communication and a sound reproducing step of reproducing the contents information received in the receiving step and outputting the reproduced information as sound from speakers (28) mounted in the vehicle.

The same object above can also be attained by an audio apparatus mounted in a vehicle (audio apparatus for a vehicle), program codes that instruct so that the operation of the audio apparatus is implement and a computer-readable storage medium that stores these program codes, which make up the audio system in the above configuration.

The same object above can also be attained by a contents reproduction method of the audio apparatus (audio apparatus for a vehicle) corresponding to the contents reproduction method of the audio system in the configuration above, program codes that instruct so that the contents reproduction method is implemented in the audio apparatus for a vehicle and a computer-readable storage medium that stores these program codes.

Other features and advantages of the present invention will be apparent from the following description taken in conjunction with the accompanying drawings, in which like reference characters designate the same or similar parts throughout the figures thereof.

DESCRIPTION OF THE DRAWINGS

The accompanying drawings, which are incorporated in and constitute a part of the specification, illustrate embodiments of the invention and, together with the description, serve,to explain the principles of the invention.

FIG. 13 is an outlined plan view of an automobile using radio communication signals directed to seat positions in a second modification of the first embodiment;

DETAILED DESCRIPTION OF THE PREFERRED EMBODIMENTS

Preferred embodiments of the present invention will now be described in detail in accordance with the accompanying drawings.

[First Embodiment]

Embodiments of the present invention applied to an automobile, a typical example of vehicle, will now be described in detail in accordance with the accompanying drawings.

Figure 1:
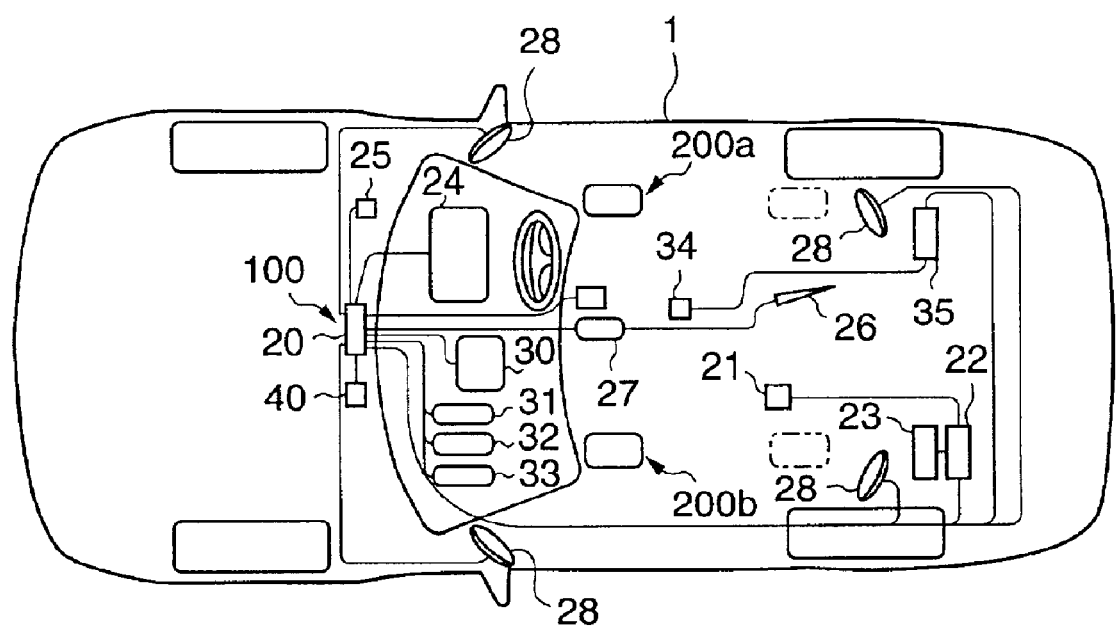
FIG. 1 is an outlined plan view of au automobile using an audio apparatus of the present invention.

FIG. 1 is an outlined plan view of au automobile using an audio apparatus (audio system) of the present invention. As shown in FIG. 1, the automobile audio apparatus of this embodiment is generally constituted by a car-mounted audio apparatus 100 (hereinafter referred to as "audio apparatus 100") mounted in a vehicle 1 and portable audio apparatuses 200a and 200b carried into the vehicle by passengers.

In the following explanations, the portable audio apparatuses 200a and 200b will sometimes be collectively called a "portable audio apparatus 200".

The audio apparatus 100 is constructed of not only an audio function but also a navigation function and Internet communication function, etc. so as to perform a variety of information processing.

A concentrated control unit 20 for controlling the entire system of the audio apparatus of this embodiment is installed close to an instrument panel in the center of the vehicle 1. This concentrated control unit 20 is connected with various apparatuses mounted in the vehicle 1 in order to perform the functions, which will be described below.

(Navigation Function)

The navigation function is intended to realize navigation functions such as route guidance to a preset desired destination and is constructed by a GPS (Global Positioning System) antenna 21 to detect the current position of the own vehicle installed in the vehicle 1, a navigation controller 22 to perform navigation control, a DVD-ROM changer 23 to read road map information, etc. stored in DVD-ROM, a display 24 that displays navigation information and allows input operations by passengers and a voice guide speaker 25 that outputs navigation information in voice, and these apparatuses are each connected to the concentrated control unit 20.

The navigation function in this embodiment is provided with functions similar to those of a conventional navigation apparatus such as detecting the current position of the own vehicle, giving the passengers road information and traffic information and providing a route guide for the automobile.

(Internet Communication Function)

The Internet communication function is constructed by a telephone antenna 26 connected to the Internet over a radio telephone network, a cellular telephone 27 to transmit/receive Internet information, the display 24 that allows input operations by the passenger, car-mounted speakers 28 that output the information received on the Internet as voice information (hereinafter referred to as "speakers 28"), etc. and these apparatuses are also each connected to the concentrated control unit 20.

This embodiment transmits/receives Internet information using the cellular telephone 27, but it is also possible to provide a dedicated Internet transmission/reception section for the main unit of the audio apparatus 100 aside from the cellular telephone 27.

The Internet communication function of this embodiment is provided with functions such as receiving various kinds of information requested by the passengers by the audio apparatus 100 over the Internet and transmitting information from the vehicle to the outside by e-mail, etc.

(Audio Function)

The audio function is constructed by an audio control unit 30 that controls the entire system of the relevant audio function, a CD drive 31 that reads CD music data, an MD drive 32 that reads MD music data, a memory drive 33 that reads music data of a memory card, speakers 28 that output music as sound in the vehicle, a car-mounted radio antenna 34 placed in the center of the vehicle to carry out radio communication with a plurality of cellular audio apparatuses 200a and 200b in the vehicle and a radio transmitter/receiver 35 that transmits/receives music data to/from the portable audio apparatuses 200a and 200b, and these apparatuses are each connected to the concentrated control unit 20.

As in the case of a conventional audio apparatus, this audio function is provided with functions such as reading contents data such as music, converted to digital data, stored in a CD, MD or memory card (hereinafter referred to as "music data"), generating reproduction signals according to the read music data and outputting the music data from the speakers 28 as music (hereinafter referred to as "reproduced output"), and also provided with a function of receiving AM/FM waves by an AM/FM tuner (not shown) and outputting AM/FM broadcasting signals from the speakers 28.

This audio function is also provided with a function of receiving digital music data using a music distribution service of the Internet and reproducing and outputting as music from the speakers 28.

The audio function of the audio apparatus 100 is further capable of communicating with a plurality of the portable audio apparatuses 200a and 200b carried into the vehicle through in-car radio communications based on a predetermined communication system and provided with a function of receiving music data retained in the portable audio apparatuses 200a and 200b and reproducing and outputting as music from the speakers 28 in the vehicle.

Note, that the concentrated control unit 20 to which these apparatuses are connected is connected to a car-mounted LAN (local area network) unit 40 as shown in FIG. 1 and is constructed so as to perform information communication with other vehicle control apparatuses.

Next, the control system and radio communication system of the audio apparatus according to this embodiment will be explained with reference to the system block diagram in FIG. 2.

Figure 2:
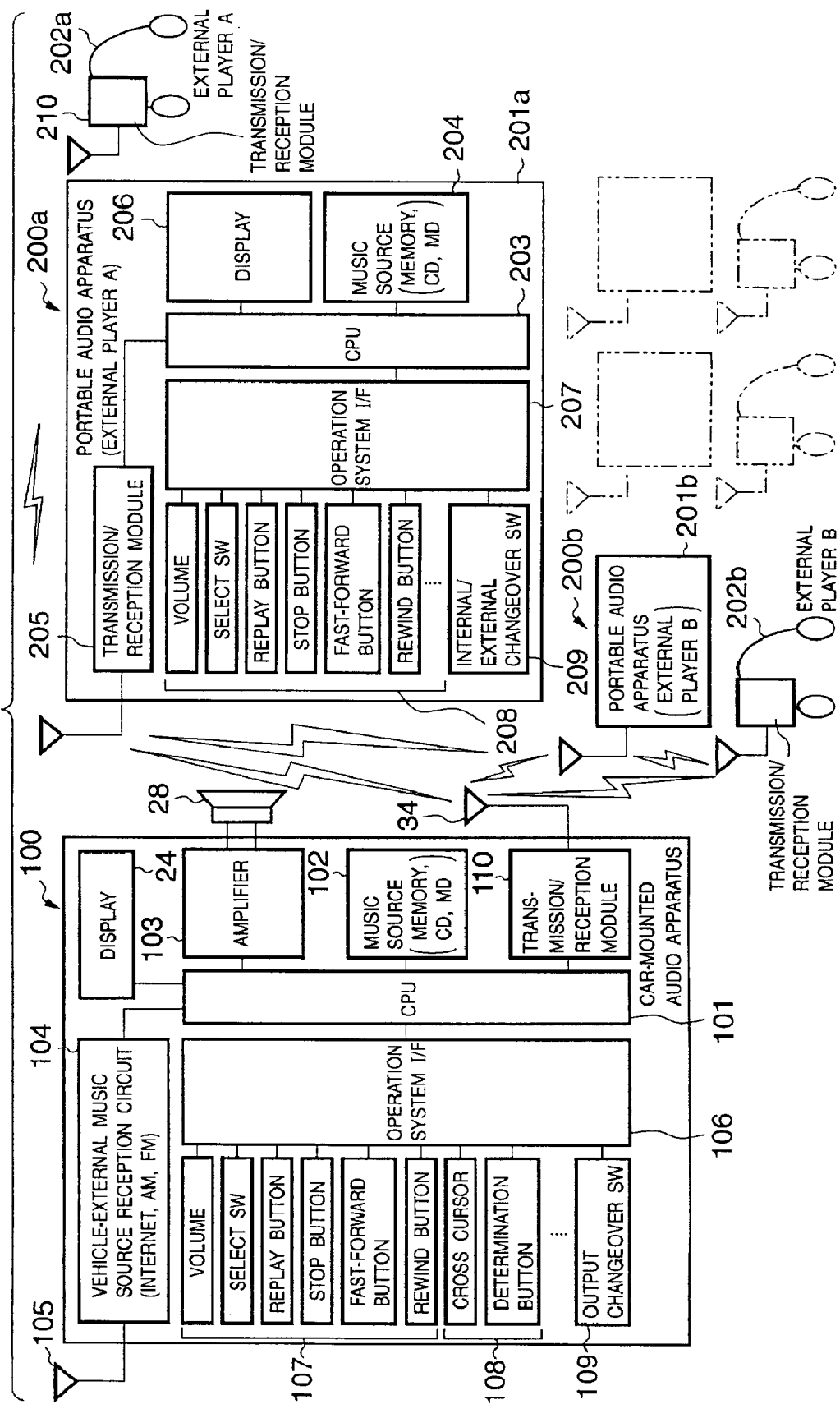
FIG. 2 is a system block diagram of an audio apparatus control system and radio communication system according to a first embodiment of the present invention.

In FIG. 2, a system block of the audio apparatus 100 is shown on the left side and a system block of the portable audio apparatus 200a is shown on the right side. FIG. 2 shows details of only the system block of one portable audio apparatus for convenience, but the system of the other portable audio apparatus is also constructed in the same way.

The audio apparatus 100 is provided with a CPU 101 and this CPU 101 controls the system of the audio apparatus 100. A music source 102 is connected to the CPU 101. The music source 102 is constructed of an information storage unit (e.g., storage medium such as semiconductor memory) that stores music data received from the outside and retains music data of the audio apparatus 100.

Furthermore, an amplifier 103 is connected to the CPU 101 and the amplifier 103 amplifies and converts music information signals which are music data stored in a storage medium reproduced and generated by the CD drive 32, etc. and reproduces and outputs as music from the speakers 28.

Furthermore, the display 24 is connected to the CPU 101 of the audio apparatus 100 and the display 24 displays the control content of the audio apparatus 100 and music source music title data, etc. Furthermore, a car external music source reception circuit 104 is connected to the CPU 101 and the car external music source reception circuit 104 receives information from the Internet and AM or FM waves through a car-external antenna 105 (telephone antenna 26, etc.).

Furthermore, audio operation switches 107 such as a volume, a select switch, a replay button, a stop button, a fast-forward button, a rewind button and a selecting/determining switch 108 to select a cross cursor button or select button and an output changeover button 109 are connected to the CPU 101 via an operation system interface 106.

Furthermore, a transmission/reception module 110 is connected to the CPU 101 and the transmission/reception module 110 carries out in-car radio communication with the portable audio apparatuses 200*a* and 200*b* carried into the vehicle via an in-car radio antenna 34.

The portable audio apparatus 200*a* is constructed of an apparatus main unit 201*a* and a headphone 202*b*.

This apparatus main unit 201*a* is provided with a CPU 203 that controls the system of the portable audio apparatus 200*a*, and a music source 204, a transmission/reception module 205, a display 206, operation switches 208 such as a volume, a select switch, a replay button, a stop button, a fast-forward button and a rewind button, etc. and internal/external changeover switch 209 are further connected to this CPU 203 via an operation system interface 207.

The headphone 202*a* of the portable audio apparatus 201*a* is also provided with a transmission/reception module 210 for radio communications, which receives music data sent from the apparatus main unit 200*a* of the portable audio apparatus through radio communication to allow the passengers to enjoy music individually.

Note, that the number of portable audio apparatuses in this embodiment is only set to 2, but it is also possible to additionally set the number according to the number of passengers as shown with virtual lines in FIG. 2.

Moreover, it is also possible to construct the apparatus main unit 201*a* and headphone 202*a* as a single apparatus.

These audio apparatus 100 and portable audio apparatuses 200*a* and 200*b* transmit/receive music data, etc. to/from each other through in-car radio communication.

As an in-car radio communication system, this embodiment adopts a short-distance data communication system that slows the apparatuses to recognize and authenticate one another in the vehicle and perform data communication among one another. More specifically, as an example of a short-distance data communication system used within a short-distance of several tens of m, this embodiment carries out a so-called Bluetooth-based radio communication.

The short-distance communication system includes radio wave communication using a spread spectrum technology, optical communication and infrared communication, etc. This embodiment adopts a radio wave communication with less directivity. However, if it is possible to construct a network in which the music apparatus 100 functions as a master and the portable music apparatuses function as slaves during a communication, other communication systems can also be adopted.

Furthermore, music data transmitted/received is preferred to be compatible to all kinds of model and transmitted/received in a short time, and therefore this music data is preferred to be transmitted/received, after being compressed as a data file based on a predetermined system and converted to compressed data.

Data compression systems available to this embodiment include MP3, Solid Audio, Liquid Audio, etc. Therefore, the audio apparatus 100 and portable audio apparatuses 200 are provided with general software or hardware capable of compressing to music data based on such a data compression system or decoding to a decoded signal at the time of reproduction.

Connecting the audio apparatus 100 and portable audio apparatus 200 through in-car radio communication and constructing a communication network (hereinafter referred to as "network") will allow each apparatus to transmit/receive music data and allow the audio apparatus 100 to control the portable audio apparatuses 200, etc.

Figure 3:
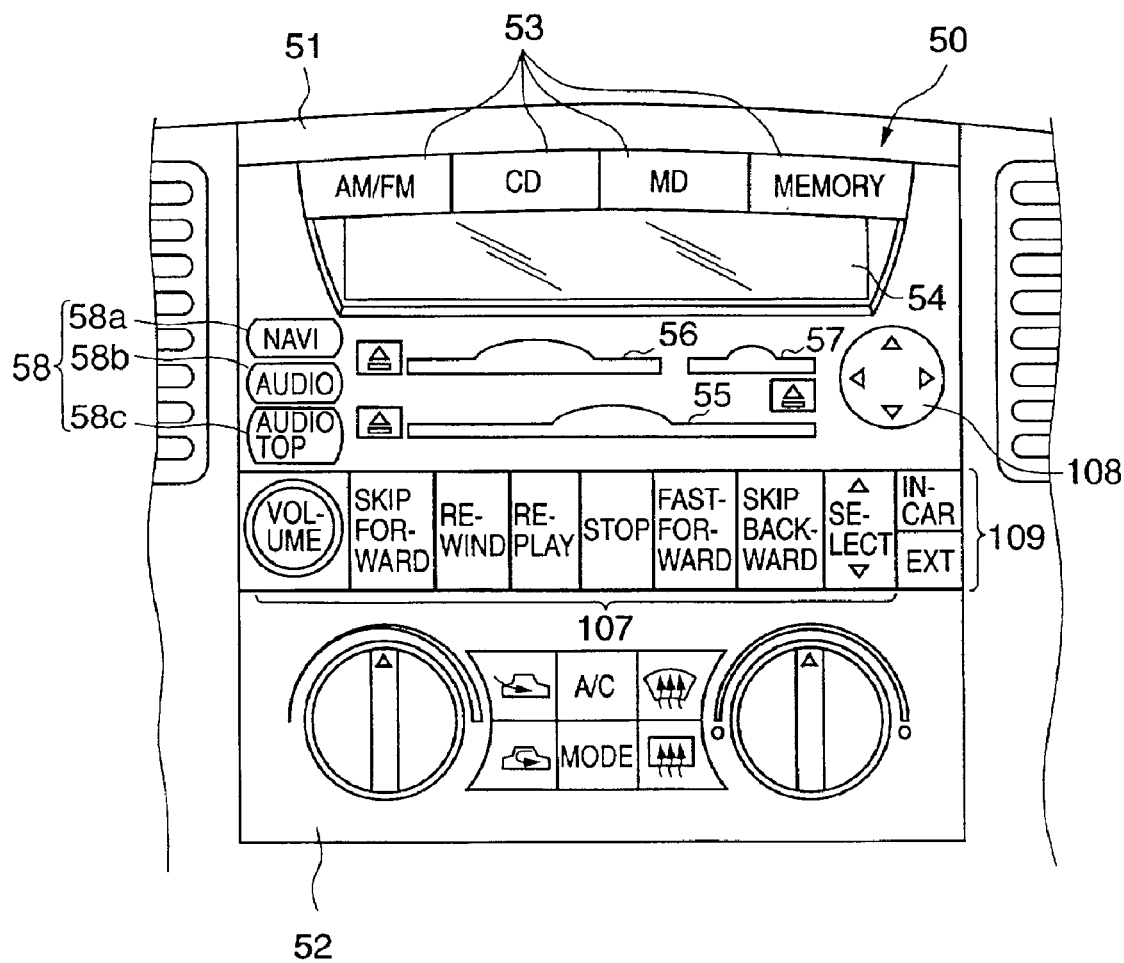
FIG. 3 is a front view of an operation panel of an audio apparatus 100 in the first embodiment.

FIG. 3 is a front view of an operation panel 50 of the audio apparatus 100 installed in the center of the instrument panel. The upper section is an operation panel 51 of the audio apparatus and the lower section is an air-conditioning-related operation panel 52. Here, the audio-apparatus-related operation panel 51 will be explained.

First, selection switches 53 for selecting a music source such as AM/FM and CD, etc. are provided in the upper section of the operation panel 50 and the music source output from the speakers 28 is determined according to the selection of these selection switches 53.

Below the selection switches 53 is a liquid crystal display panel 54. The liquid crystal display 54 displays a set temperature and in-car temperature or music information of the audio apparatus 100, etc.

Below the liquid crystal display 54 are slot openings 55, 56 and 57. Inserting various storage media such as a CD, MD or memory card into these slot openings 55, 56 and 57 allows the audio apparatus 100 to incorporate music data of music sources.

To the left of the slot openings 55 and 56 are screen changeover switches 58 to switch the display screen of the liquid crystal display 54. At the top is a navigation switch 58*a* to switch the display screen to a navigation screen, in the center is an audio switch 58*b* to switch the display screen to an audio screen and at the bottom is an audio top switch 58*c* to switch the display screen to an audio top menu screen of in-car radio communication.

The display 24 of the audio apparatus 100 is set on an instrument panel (not shown) close to a driver seat easily recognizable by the passengers and constructed to display an audio screen such as various kinds of information of the audio apparatus. Note, that the above-described liquid crystal display panel 54 can also be used as the display 24 of the audio apparatus 100.

To the right of the slot openings is a cross cursor/determination button 108 to move the cursor on a display screen and determine a predetermined item.

Below the slot openings are audio operation switches 107 whereby the passengers can input audio operation signals such as replay, stop or volume. These audio operation switches 107 are a power volume switch, skip switch, etc. from the left. At the right end are output changeover switches 109 that allow the passenger to switch the output destination of the audio operation signal which is output by the passenger manipulating the audio operation switches 107 between the audio apparatus 100 and portable audio apparatuses 200.

Then, the action and method of operation of the audio apparatus according to this embodiment will be explained using FIG. 4 to FIG. 11.

Figure 4:
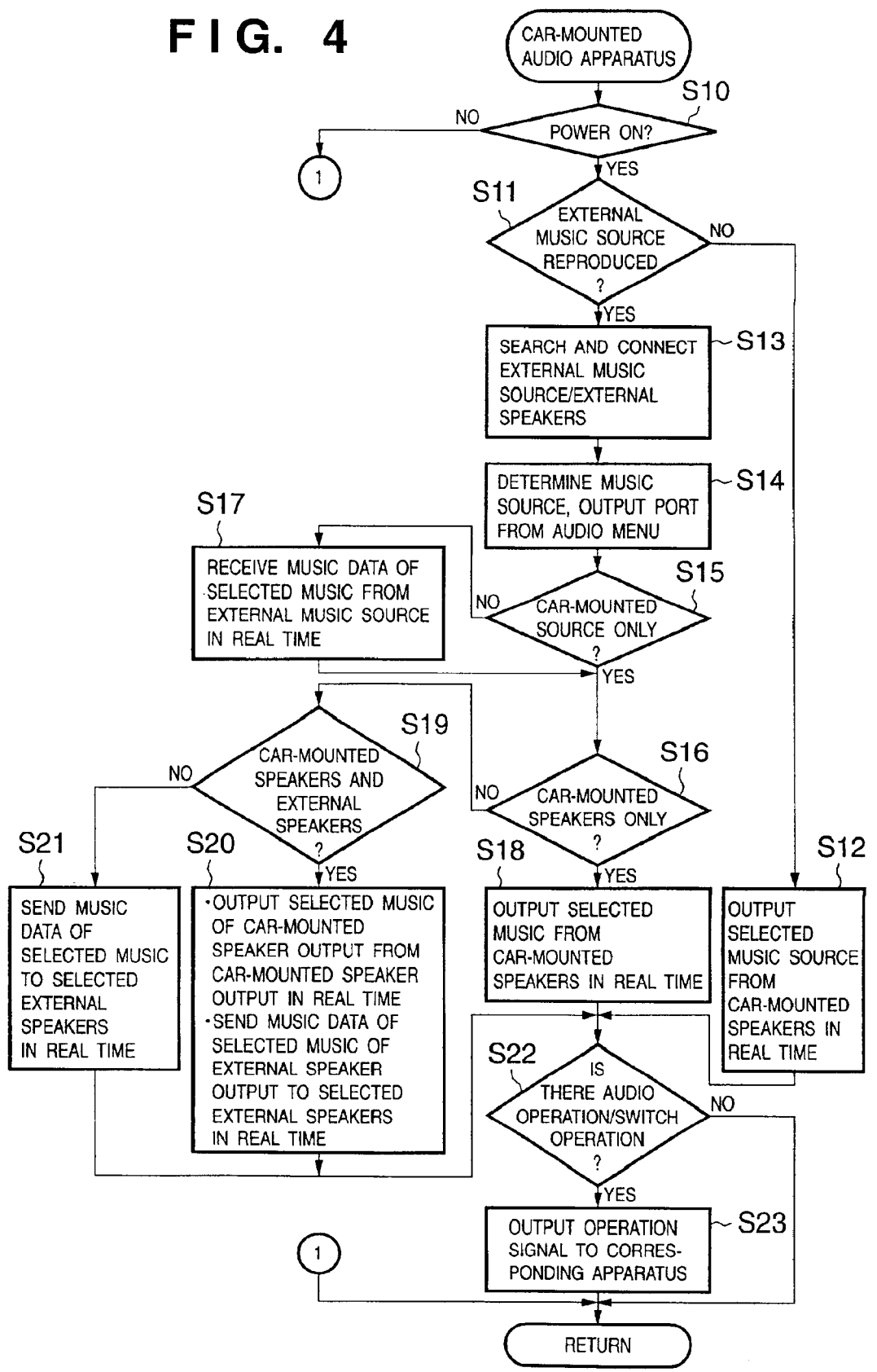
FIG. 4 is a flow chart of operation control of the audio apparatus 100 in the first embodiment.

First, the action of the audio apparatus 100 will be explained using the flow chart of operation control of the audio apparatus 100 shown in FIG. 4. This flow chart indicates the procedure of a software program executed by the CPU 101 and the control processing by the CPU 101 is started by an ignition ON of the vehicle 1, for example.

Initially, it is judged whether a power switch of the audio apparatus 100 (not shown) is ON or not (S10) and when the judgment result is NO, the process goes to Return and when the judgment result is YES, it is judged whether an external music source (each of the portable audio apparatuses 200) is replayed or not (S11).

If the result of the judgment (S11) as to whether the external music sources 200a and 200b are replayed or not is NO, music data of the music source 102 (CD, MD, memory card, etc.) of the audio apparatus 100 is directly reproduced and output from the speakers 28 as in the case of a normal audio apparatus (S12). On the other hand, if the judgment result is YES, the existence of any external music source (apparatus main units 201a and 201b of the portable audio apparatuses) and external speakers (headphones 202a and 202b of the portable audio apparatuses) carried into the vehicle is searched, and the external music source whose existence has been confirmed is connected to the audio apparatus 100 through an in-car radio communication (S13).

The search connection operation in S13 is started by the passenger operating the audio top switch 58c on the operation panel 51 of the audio apparatus 100. More specifically, the passenger makes an "AUDIO TOP MENU" shown in FIG. 5 appear on the display screen and selects and determines "External music source/external speaker search and reception" D1 with a cross cursor/determination button 108.

Figure 6:
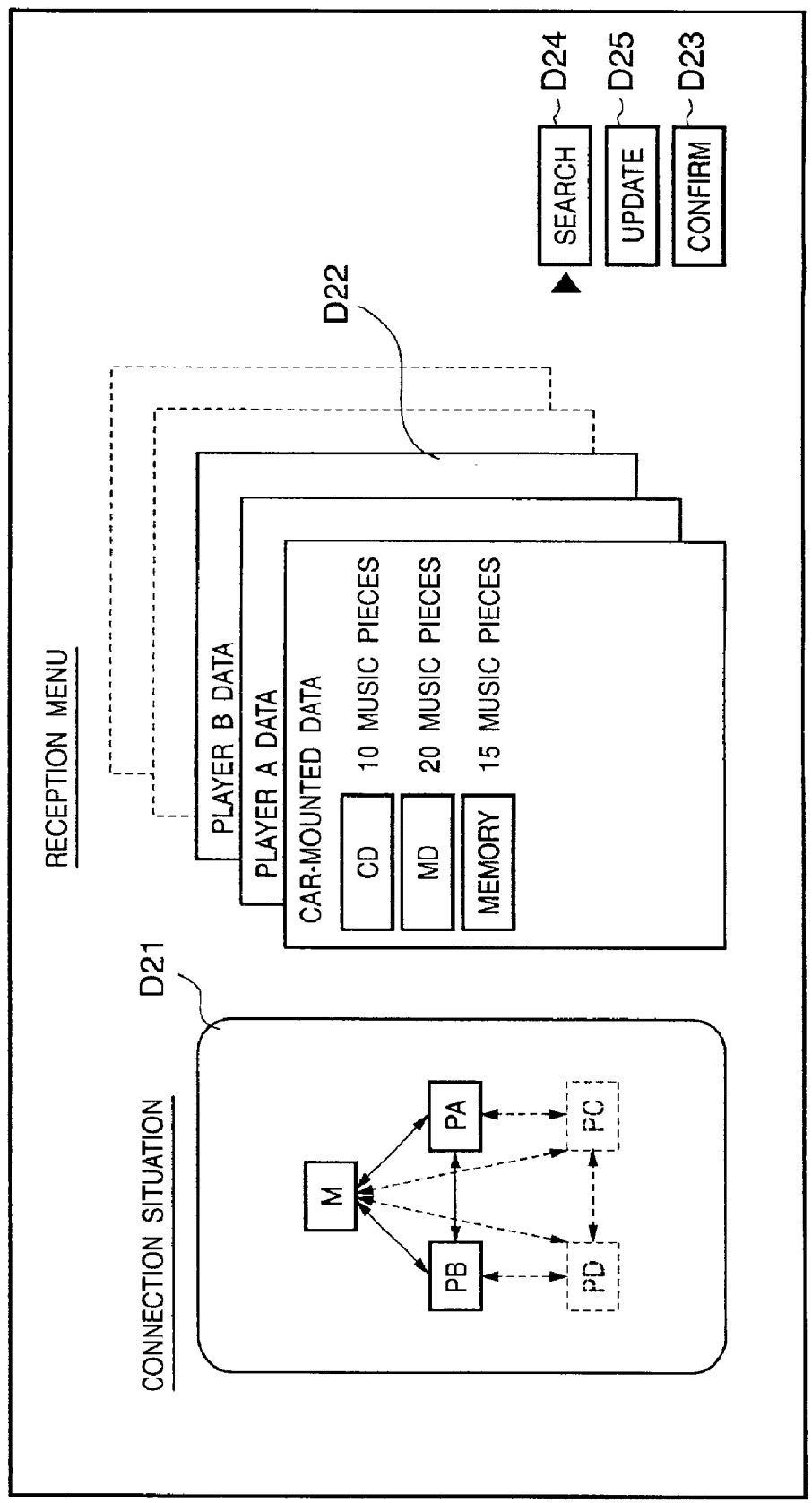
FIG. 6 is a "reception MENU" screen shown on a display in the first embodiment.

In this case, if the passenger selects/determines "External music source/external speaker search and reception" D1, the display screen is switched to the "Reception MENU" screen shown in FIG. 6 and a search radio wave is emitted from the in-car radio antenna 34 of the audio apparatus 100. This allows the audio apparatus 100 to connect the apparatuses 201a and 201b of the portable audio apparatuses in the vehicle to the headphones 202a and 202b for a search.

At this time, installed in the center of the vehicle, the in-car radio antenna 34 can emit the search radio wave uniformly in the vehicle and detect the portable audio apparatuses 200 in the vehicle uniformly. Furthermore, even if portable audio apparatuses 200 owned by persons other than the passengers happen to exist outside near the vehicle, this reduces the probability of an erroneous search.

When the portable audio apparatuses 200a and 200b are detected and connected within a predetermined search time, the audio apparatus 100 and the plurality of portable audio apparatuses 200a and 200b send an identification address to each other and form a network through an in-car radio communication. Once the network is constructed, the "Reception MENU" screen looks as shown in FIG. 6.

For example, when the audio apparatus 100 finds and recognizes two portable audio apparatuses 200a and 200b in the vehicle, these apparatuses construct a communication system with the audio apparatus 100 as a master and the portable audio apparatuses 200a and 200b as slaves and recognize one portable audio apparatus 200a as an external player A and the other portable audio apparatus 200b as an external player B. Then, the "Reception MENU" screen shows the connection states in simplified expressions indicating the audio apparatus 100 as M and the portable audio apparatuses as PA and PB (D21). Note, that the "Reception MENU" screen also shows a list of music title data, etc. associated (correspondence established) with music data (contents data) of each apparatus connected (D22).

When the apparatuses have constructed the network by means of in-car radio communication, the passenger operates the cross cursor/determination button 108 to select/determine "Confirm" D23 on the "Reception MENU" screen and terminates the search connection operation.

However, if it is judged that the search/connection is insufficient, the passenger operates the cross cursor/determination button 108 to select/determine "Search" D24 to continue the search/connection. This ensures that the apparatuses are connected to construct the network.

Note, if the number of the portable audio apparatuses 200 in the vehicle changes, it is necessary to perform search/connection every time, but if the passenger selects/determines "Update" D25 on the "Reception MENU" screen, it is possible to set the audio apparatus 100 so as to automatically repeat search/connection at predetermined intervals.

After external music sources (apparatus main units of the portable audio apparatuses), external speakers (headphones) have been searched/connected (S13), a music source and output port are determined on the "AUDIO MENU" screen (S14).

Figure 7:
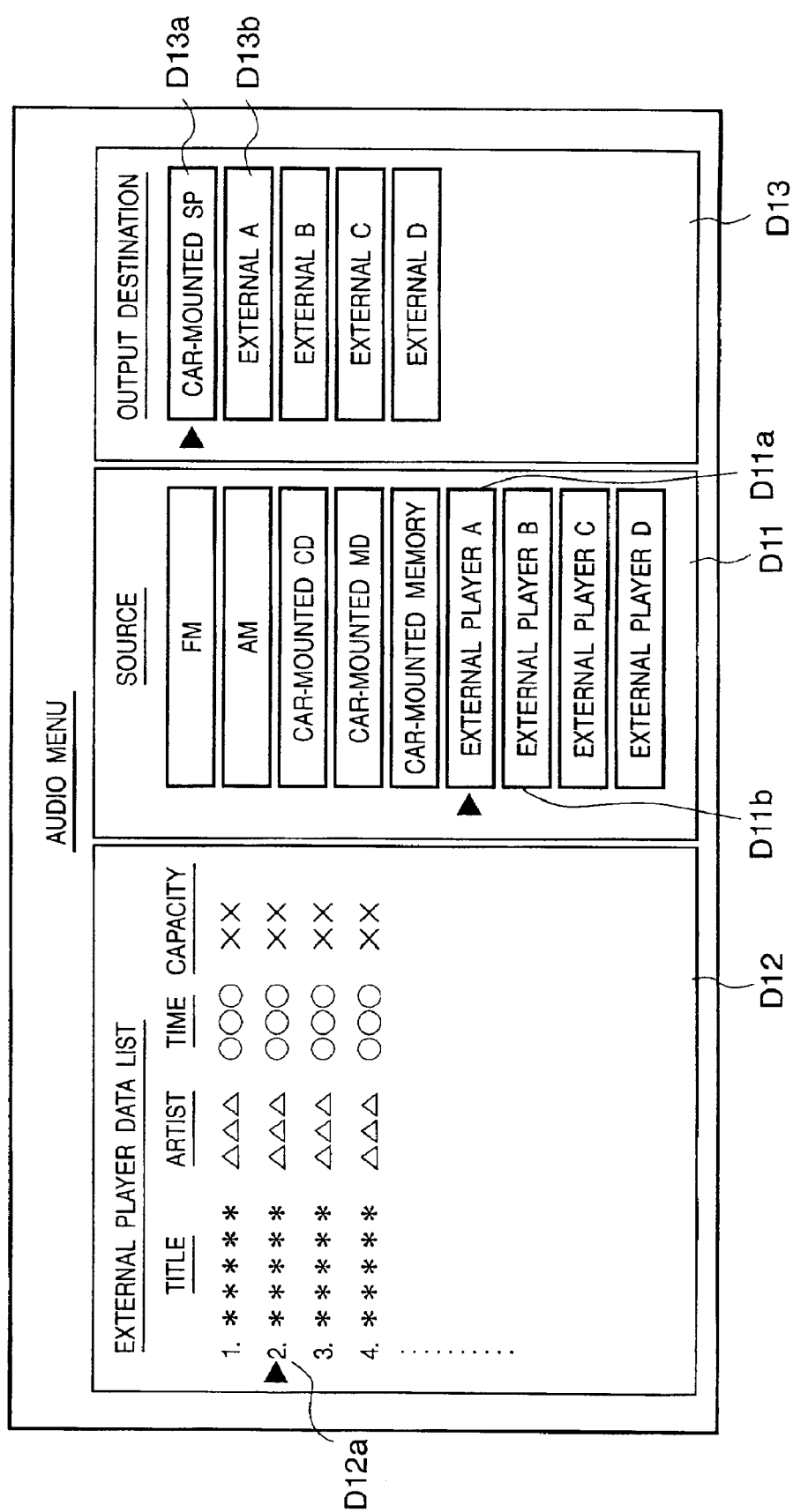
FIG. 7 is an "AUDIO MENU" screen shown on a display in the first embodiment.

The music source/output port determination operation in S14 is carried out by the passenger operating the cross cursor/determination button 108 on the "AUDIO TOP MENU" screen to select/determine "Determine music replay/output destination" D1 and making the display screen show the "AUDIO MENU" screen shown in FIG. 7.

Here, the music source/output port determination operation in S14 will be explained more specifically. For example, if the passenger wants to replay the second music of the portable audio apparatus 200a identified as the external player A from the speakers 28, the passenger selects/determines "External player A" D11a in the "Source" selection area D11 on the "AUDIO MENU" screen. Then, a music data list D12 of the portable audio apparatus 200a of the external player A is displayed on the left. This music data list D12 shows music titles, artist names and data volumes, etc. and shows the content of the music data retained in the portable audio apparatus 200a.

The passenger operates the cross cursor/determination button 108 in this music data list D12 displayed to select/determine the "Second music" D12a. Then, the passenger selects/determines "Car-mounted SP" D13a in the "Output destination" selection area D13 (selection/determination content in FIG. 7).

When the passenger who carries the portable audio apparatus 200a of the external player A personally wants to replay all music pieces of the music data of the portable audio apparatus 200b of the external player B carried by another passenger through the own headphone, the passenger selects/determines "External player B" D11b in the "Source" selection area D11 on the "AUDIO MENU" screen and makes the music data list (not shown) of the portable audio apparatus 200b of the external player B appear and selects/determines the "External player B" D11b in the "Source" selection area D11 again. Thus, the passenger selects all music pieces of the portable audio apparatus 200b of the external player B and then selects/determines the "External player A" D13b in the "Output destination" selection area D13.

Thus, the passenger further performs operation of determining a music source, output port according to the request of a passenger and terminates the music source/output port determination operation.

The music source/output port determination operation according to the request of each passenger is performed in this way.

Note, when the passenger performs no music source determination operation in the above music source/output port determination operation, all music data pieces of the portable audio apparatuses are selected one after another starting from the external player A and all music data pieces of the portable audio apparatuses are reproduced/output from the speakers 28 or those portable audio apparatuses one after another. Thus, if the, passenger does not want to listen to any particular music but simply wants to listen to music as BGM, then the passenger need not perform any music source determination operation.

After the passenger determines the music source/output port on the "AUDIO MENU" screen, it is judged whether the selected music source is only a car-mounted source (music source of the audio apparatus 100) or not (S15).

If the judgment result in S15 is YES, it is judged whether the output destination is only the speakers 28 or not (S16).

On the other hand, if the judgment result in S15 is NO, the music data of the music selected from external music sources (portable audio apparatuses 200a and 200b) is received and the received music data is stored in an information storage unit (not shown) such as a semiconductor memory of the audio apparatus (S17). Then, it is judged whether the output destination set in S14 is the speakers 28 only or not (S16).

That is, if the external music sources (portable audio apparatuses 200a and 200b) are selected in the "Source" selection area D11, the music data sent from the portable audio apparatuses 200a and 200b are received by the audio apparatus 100 in real time and the received music data is immediately subjected to predetermined processing such as decoding and then reproduced and output.

Note, even if the external music sources (portable audio apparatuses 200a and 200b) are selected consecutively, control is performed such that the music data is transmitted/ received in real time and reproduced/output.

Then, if the result of judgment in S16 as to whether the selected output destination is only the speakers 28 or not is YES, the selected music is reproduced and output from the speakers 28 in real time (S18). On the other hand, if the judgment result is NO, it is further judged whether the output destination is the speakers 28 and external speakers (headphones 202a, 202b) or not (S19).

If the judgment result in S19 is YES, the selected music (music previously selected by the passenger to be replayed) to be output from the speakers 28 is reproduced and output from the speakers 28 and the selected music to be output from the external speakers is sent to the selected external speakers (headphones 202a, 202b) (S20).

Thus, if the two output destinations of the music data, the speakers 28 and external player A, are selected/determined, the speakers 28 reproduce and output the music data of the portable audio apparatus 200a, which is the external player A, in real time and the headphone 202a of the external player A reproduces and outputs the music data of the portable audio apparatus 200b, which is the external player B, in real time.

In this case, the music data of the portable audio apparatus 200b, which is the external player B, can also be sent directly from the portable audio apparatus 200b, which is the external player B, to the headphone 202a of the external player A in real time bypassing the car-mounted audio apparatus 100.

If the judgment result in S19 is NO, that is, if the output destination is only the external speakers, the music data of the selected music is sent to the selected external speakers (headphones 202a and 202b of the portable audio apparatuses) (S21).

Thus, if, for example, the above selection is made in "AUDIO MENU", the second music data is sent in real time from the portable audio apparatus 200a, external player A, to the audio apparatus 100, reproduced/output from the car-mounted speakers 28 and all music data pieces of the portable audio apparatus 200b, external player B, are sent in real time to the portable audio apparatus 200a, external player A, and reproduced/output in real time from the headphone 202b of the external player A.

Then, in the above control state, it is judged whether the passenger has operated the audio operation switch 107 or not (S22). If the audio operation switch 107 has been operated, an audio operation signal corresponding to the operation is output from the relevant switch.

If the judgment result in S22 is YES, an audio operation signal is output to the corresponding apparatuses according to the output changeover switch 109 that switches the output destination of the audio operation signal (S23).

Thus, when the passenger operates the fast-forward switch, if the audio apparatus 100 has been selected by the output changeover switch 109, the music reproduced and output from the speakers 28 is fast-forwarded. On the other hand, if the portable audio apparatus 200a of the external player A has been selected by the output changeover switch 109, the music reproduced and output from the headphone 202a of the portable audio apparatus is fast-forwarded.

If the judgment result in S22 is NO, that is, if the passenger has not operated the audio operation switches 107, the process directly shifts to Return.

Communication control and audio control of the audio apparatus 100 are carried out in this way.

Figure 8:
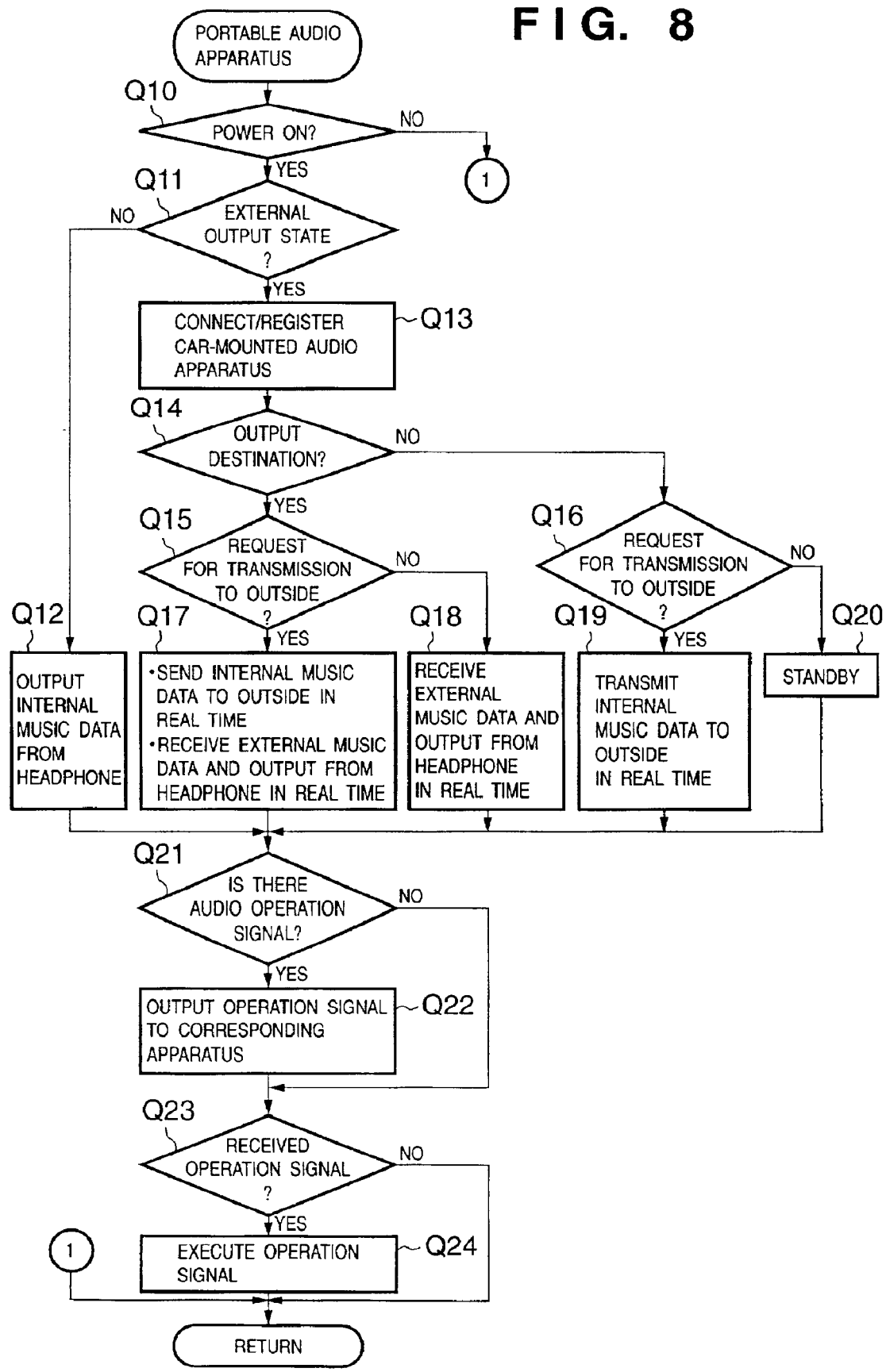
FIG. 8 is a flow chart of operation control of a portable audio apparatus 200 in the first embodiment.

Then, the operation of the portable audio apparatus 200 will be explained using the flow chart of operation control of the portable audio apparatus 200 shown in FIG. 8. This flow chart indicates the procedure of a software program executed by the CPU 203.

Here, the portable audio apparatus 200a, which is the external player A, will be explained, but the other portable audio apparatus will be operated in the same way.

First, it is judged whether the power of the portable audio apparatus 200a is ON or not (Q10) and if the judgment result is NO, the process shifts to Return and if the judgment result is YES, it is judged whether the internal/external changeover switch 209 of the portable audio apparatus 200a is in an external output state or not (Q11).

If the result of the judgment about the external output state is NO, the music data (hereinafter referred to as "internal music data") of the music sources 204 (CD, MD, memory card, etc.) of the portable audio apparatus is output/reproduced from the headphone 202a as in the case of a normal portable audio apparatus (Q12).

On the other hand, the judgment result in Q11 is YES, the relevant portable audio apparatus 200 is connected and registered in the audio apparatus 100 in accordance with the aforementioned search/connection operation of the audio apparatus 100 (Q13). Thus, the portable audio apparatus 200a constitutes a network together with other apparatuses (audio apparatus 100, portable audio apparatus 200b) via in-car radio communication.

When the relevant portable audio apparatus 200 is connected to and registered in the audio apparatus 100, then it is judged whether the own portable audio apparatus 200a is selected by the passenger as the output destination through the selection signal received by the audio apparatus 100 (Q14).

Then, whether the judgment result in Q14 is YES or NO, it is judged whether there is any request for sending internal music data to the external apparatuses (audio apparatus 100 or other portable audio apparatus 200b) (Q15, Q16)

When it is judged that the own portable audio apparatus 200a is the output destination and there is a request for sending internal music data to the audio apparatus 100 or other portable audio apparatus 200b (hereinafter referred to as "external apparatuses"), the internal music data is sent to the external apparatuses in real time and at the same time, the music data of the external apparatuses (hereinafter referred to as "external music data") is received and reproduced/output from the headphone 202a of the portable audio apparatus in real time (Q17).

Thus if, for example, the music source/output port is selected/determined on the "AUDIO MENU" screen as shown above, the music data retained in the portable audio apparatus 200a of the external player A is sent to the audio apparatus 100 and the passenger can replay the music data in the vehicle in real time and at the same time, the headphone 202a of the external player A receives in real time the music data retained in the portable audio apparatus 202b of the external player B and the passenger can personally replay the music data.

On the other hand, if it is judged in Q14 and Q15 that the own portable audio apparatus 200a is the output destination and there is no request for sending internal music data to the external apparatuses, the external music data is received and the headphone 202a reproduces and outputs the music data in real time (Q18).

Thus in this case, the passenger can receive the music data of the audio apparatus 100 or music data of the other portable audio apparatus 200b in real time and personally enjoy the music data by the headphone 202a without sending the music data from the own portable audio apparatus 200a to the external apparatuses.

On the other hand, if it is judged in Q14 and Q16 that the own portable audio apparatus 200a is not the output destination and there is a request for sending internal music data to the external apparatuses, the internal music data is sent to the external apparatuses in real time (Q19).

Thus, in this case, no music is reproduced/output from the headphone 202a and it is not possible to personally enjoy music but it is possible to send the music data to the audio apparatus 100 or other portable audio apparatus 200b and enjoy in real time the music data retained in the own portable audio apparatus 200a using the speakers 28 or the headphones 202b of the other portable audio apparatuses.

Furthermore, if it is judged in Q14 and Q16 that the own portable audio apparatus 200a is not the output destination and there is no request for sending internal music data to the external apparatuses, either, then the internal music data and external music data are not transmitted/received and the portable audio apparatus 200a is held in a standby state (Q20).

In this case, the portable audio apparatus 200a neither reproduces/outputs from the headphone 202a nor sends the music data to the external apparatuses.

Then, in the above control state, it is judged whether the passenger has operated the audio operation switch 208 of the portable audio apparatus 200a or not (Q21).

If the judgment result in Q21 is YES, an audio operation signal according to the operation of the audio operation switches 208 is output to the corresponding audio apparatus (Q22).

For example, if the music data reproduced/output from the headphone 202a is the music data retained in the audio apparatus 100, an audio operation signal is sent to the audio apparatus 100. Furthermore, if the music data reproduced/ output from the headphone 202a is the music data retained in the other portable audio apparatus, the audio operation signal is sent to the other portable audio apparatus 200b. In the case of the own music source 204, the own portable audio apparatus 200a is controlled as is.

On the other hand, if the judgment result in Q21 is NO, the portable audio apparatus 200a maintains its control state without sending the audio operation signal.

Then, it is judged whether the audio operation signal has been received from the external apparatuses or not (Q23).

If the judgment result in Q23 is YES, the audio operation of the internal music data is executed according to the received audio operation signal (Q24), and if the judgment result is NO, the control state is maintained as is and the process shifts to Return.

Thus, if the audio operation signal is received from an external apparatus, the music data of the own portable audio apparatus 200a is subjected to audio-operations by the external apparatus (audio apparatus 100 or other portable audio apparatus 200b).

For example, it is possible to audio-operate the music data of the portable audio apparatus 200a by operating the audio operation switch 107 of the audio apparatus 100 or audio-operate the music data of the audio operation switches 208 of the portable audio apparatus 200b of the external player B by operating the audio operation switches 208 of the portable audio apparatus 200a of the external player A. Thus, operating the own portable audio apparatus without causing trouble to other passengers can freely and easily perform audio operations of the music that one enjoys.

Communication control and audio control of the portable audio apparatuses are carried out in this way.

Then, the operation of erasing music data retained in the audio apparatus 100, etc. will be explained.

This music data erasure operation erases the music data selected by the passenger from the information storage unit of the audio apparatus 100 and thereby can arrange music data of the information storage unit at the request of the passenger.

Figure 9:
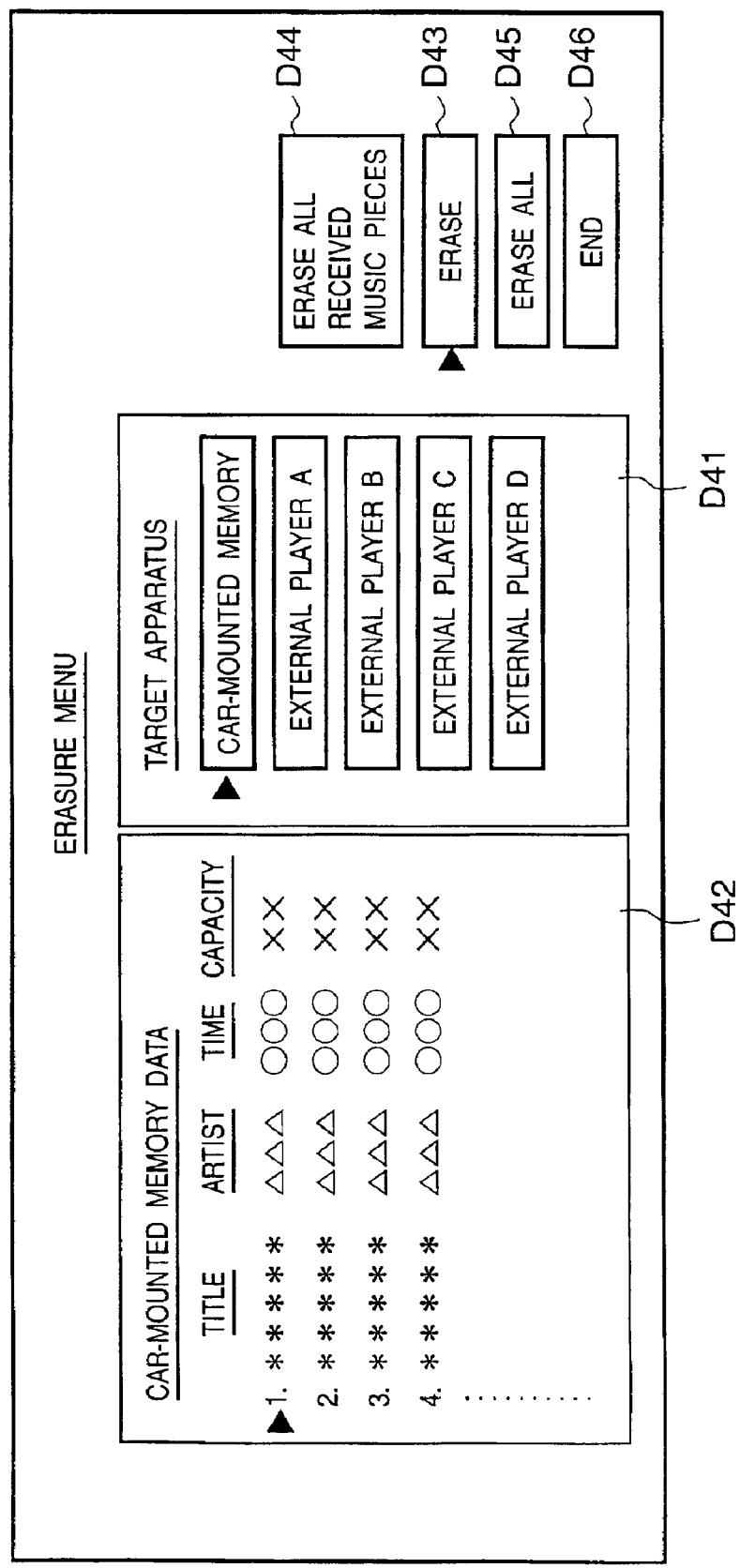
FIG. 9 is an "erasure MENU" screen shown on a display in the first embodiment.

This erasure operation is carried out by the passenger operating the audio top switch 58c on the operation panel 51 of the audio apparatus 100, displaying the "AUDIO TOP MENU" screen shown in FIG. 9 on the display screen and selecting/determining "Erase received music" D4 with the cross cursor/determination button 108.

If the passenger selects/determines "Erase received music" D4, the display screen is switched to the "Erasure MENU" screen shown in FIG. 9, which displays the storage content of the music data and target apparatuses and erasure method.

From this "Erasure MENU" screen, if the passenger selects/determines the apparatus storing the music data to be erased in the "Target apparatus" selection area D41, the storage content of the corresponding apparatus is displayed in the "Memory data" display area D42.

The music data (contents data) is associated with the corresponding music title data (title data) and the audio apparatus 100 displays characters that represent the corresponding music titles in the "memory data" display area D42 according to the music title data. When the passenger selects/determines the music title of the music data to be erased with the storage content displayed in the "memory data" display area D42 and selects/determines the "Erase" D43, the music data that the passenger wants to erase is erased from the information storage unit of the corresponding apparatus.

For example, if the passenger wants to erase the first music of the information storage unit of the audio apparatus 100, the processing of erasing music data is performed by selecting/determining the selection content shown in the "Erasure MENU" screen in FIG. 9.

Note, this embodiment also sets external players (external player A, external player B, etc.) in the "Target apparatus" selection area D41 so as to erase the storage content of the portable audio apparatuses 200a and 200b, too.

As the erasure method, "Erase all received music pieces" D44 and "Erase all" D45 are set in addition to "Erase" D43. Here, "Erase all received music pieces" means a method of erasing all music data received from other apparatuses and stored and "Erase all" means a method of erasing all music data stored in the information storage unit of a desired apparatus together with music data stored independently.

After erasing the music data to be erased, selecting/determining "End" D46 terminates the erasure operation.

Then, the Internet operation will be explained, which receives digital music data from outside the vehicle and reproduces/outputs the music data as music from the speakers 28.

Figure 5:
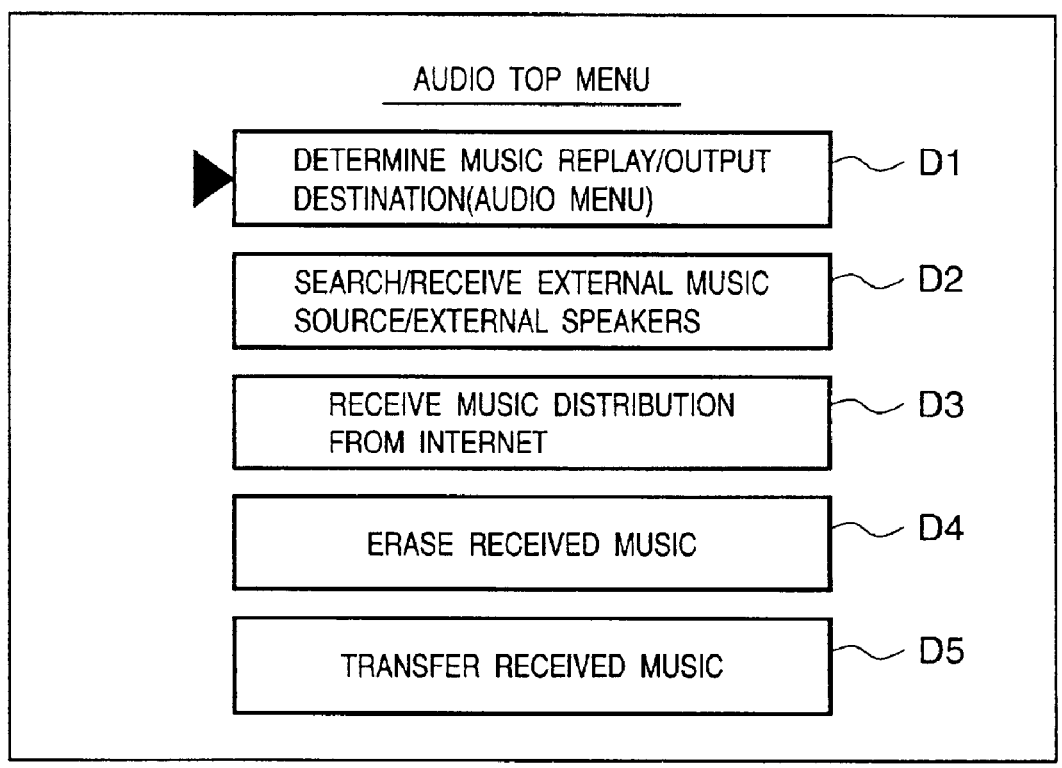
FIG. 5 is an "AUDIO TOP MENU" screen shown on a display in the first embodiment.

The Internet operation is carried out by the passenger operating the audio top switch 58c on the operation panel 51 of the audio apparatus 100, displaying the "AUDIO TOP MENU" screen shown in FIG. 5 on the display screen and selecting/determining "Receive music from Internet" D3 with a cross cursor/determination button.

Figure 10:
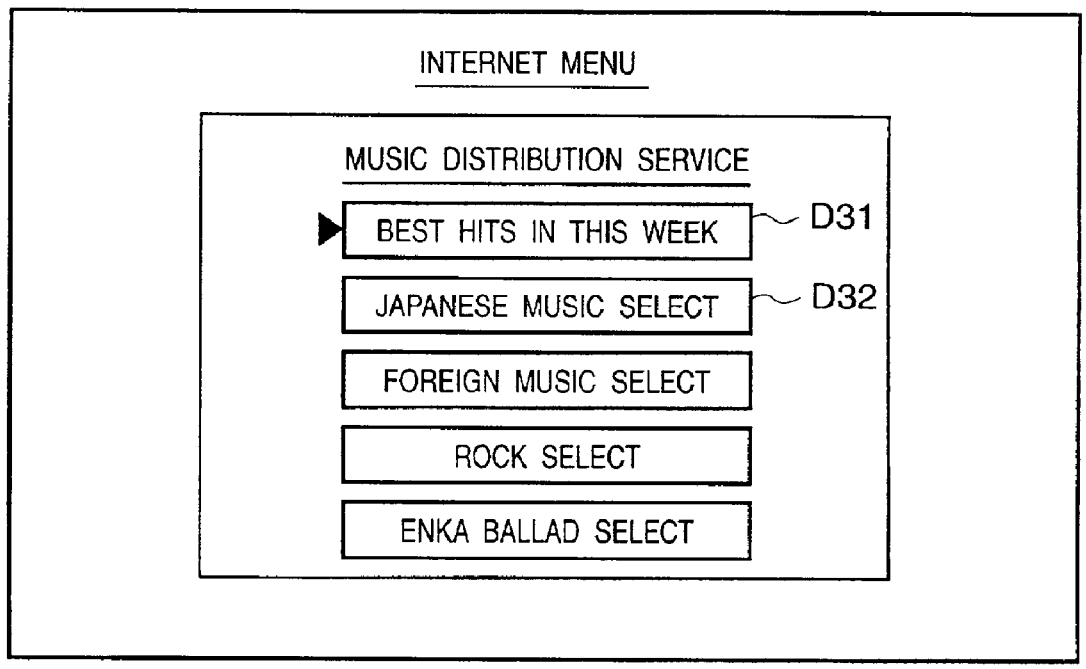
FIG. 10 is an "Internet MENU" screen shown on a display in the first embodiment.

When the passenger selects/determines "Receive music from Internet" D3, the display screen is switched to the "Internet MENU" screen shown in FIG. 10 and the apparatus is connected to the Internet.

The "Internet MENU" screen displays the music distribution service site screen and shows "Best hits in this week" D31, "Traditional Japanese music select" D32, etc. allowing the passenger to select music data from a variety of genre.

The passenger selects/determines the item of genre of his/her choice from this "Internet MENU" screen, selects/determines the music data of the music to be distributed and receives the music. Then, the audio apparatus 100 temporarily stores the received music data in the information storage unit and reproduces/outputs the music data as music from the speakers 28 according to the operation of the passenger.

In this way, using music distribution of the Internet makes it possible to replay a large amount of new music in the vehicle.

Then, a data transfer will be explained, which transfers music data stored in each apparatus to another apparatus and sends/receives music data between different apparatuses.

The data transfer operation is carried out by the passenger operating the audio top switch on the operation panel 51 of the audio apparatus 100, displaying the "AUDIO TOP MENU" screen shown in FIG. 5 on the display screen and selecting/determining "Transfer received music" D5 with a cross cursor/determination button.

Figure 11:
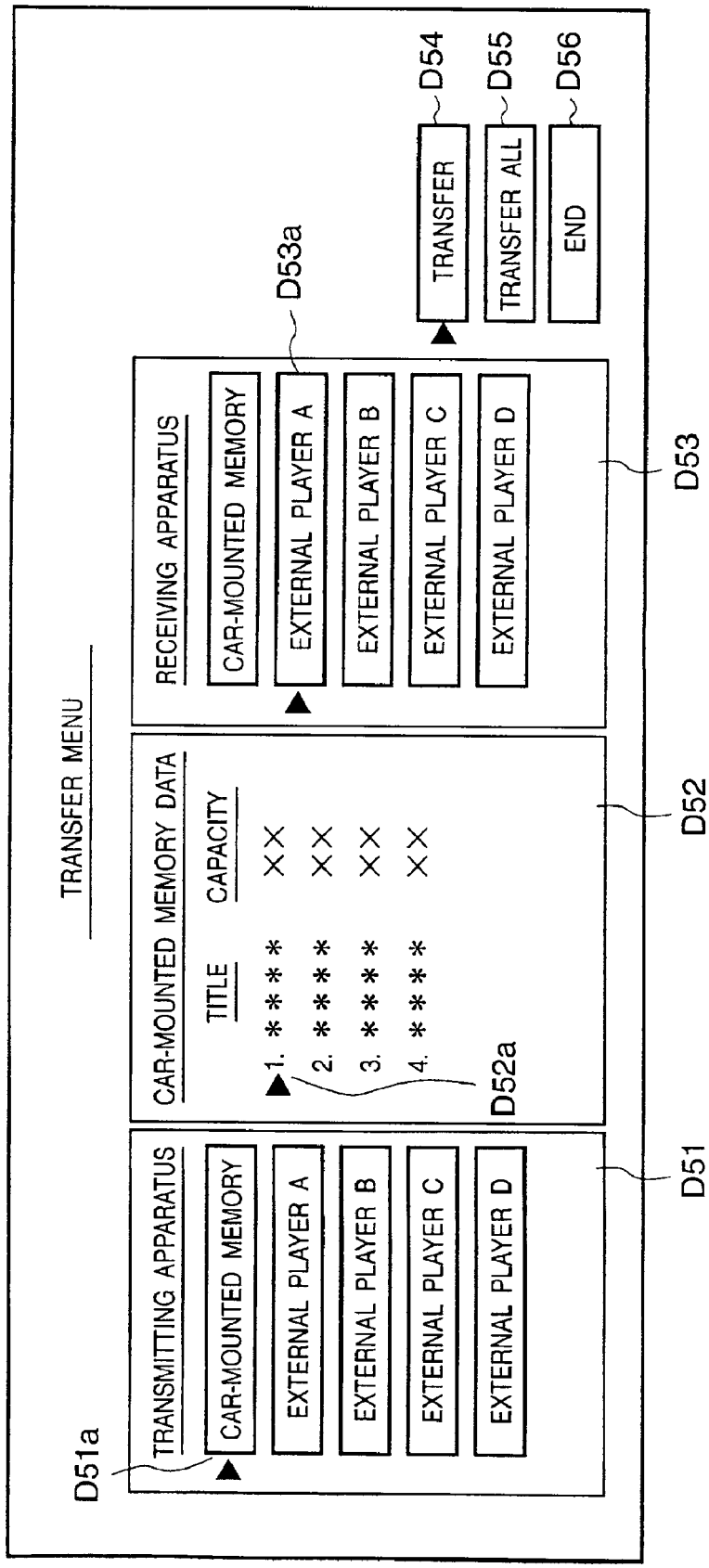
FIG. 11 is a "Transfer MENU" screen shown on a display in the first embodiment.

When the passenger selects/determines "Transfer received music" D5, the display screen is switched to the "Transfer MENU" screen shown in FIG. 11 and the transmitting apparatus, storage content of the music data, receiving apparatus and transfer method are shown.

Music data is transferred between different apparatuses by the passenger selecting/determining a desired item with the cross cursor/determination button 108 on the "Transfer MENU" screen.

For example, when the passenger wants to transfer the music data of the first music from the information storage unit of the audio apparatus 100 to a portable audio apparatus 200a of the external player A, the passenger selects/determines the "Car-mounted memory" D51a in the "Transmitting apparatus" selection area D51 as the selection content of the "Transfer MENU" screen, displays the car-mounted memory data D52, which is the storage content of the information storage unit of the audio apparatus 100 and selects/determines the music data D52a of the first music in the car-mounted memory data D52. Then, the passenger selects/determines the external player AD53a in the "Receiving apparatus" selection area D53.

After selecting/determining music data in this way, selecting/determining the "Transfer" D54 allows the music data of the first music to be transferred from the information storage unit of the audio apparatus 100 to the portable audio apparatus 200a of the external player A.

If the passenger wants to transfer all music data, the passenger selects/determines "Transfer all" D55 in the car-mounted memory data D52 instead of selecting/determining specific music, then all music data is transferred at a time.

After transferring music data, selecting/determining "End" D56 terminates the data transfer operation.

In this data transfer, selecting/determining external players in the "Transmitting apparatus" selection area D51 and the "Receiving apparatus" selection area D53 also allows a data transfer of music data between the selected plurality of portable audio apparatuses 200.

A data transfer being enabled between apparatuses, it is possible to easily exchange music data not only between the audio apparatus 100 and portable audio apparatuses 200 but also between the portable audio apparatuses. Thus, it is possible to freely exchange music data of preference between passengers or freely transfer music data of the audio apparatus 100 to a portable audio apparatus.

<First Modification of First Embodiment>

Figure 12:
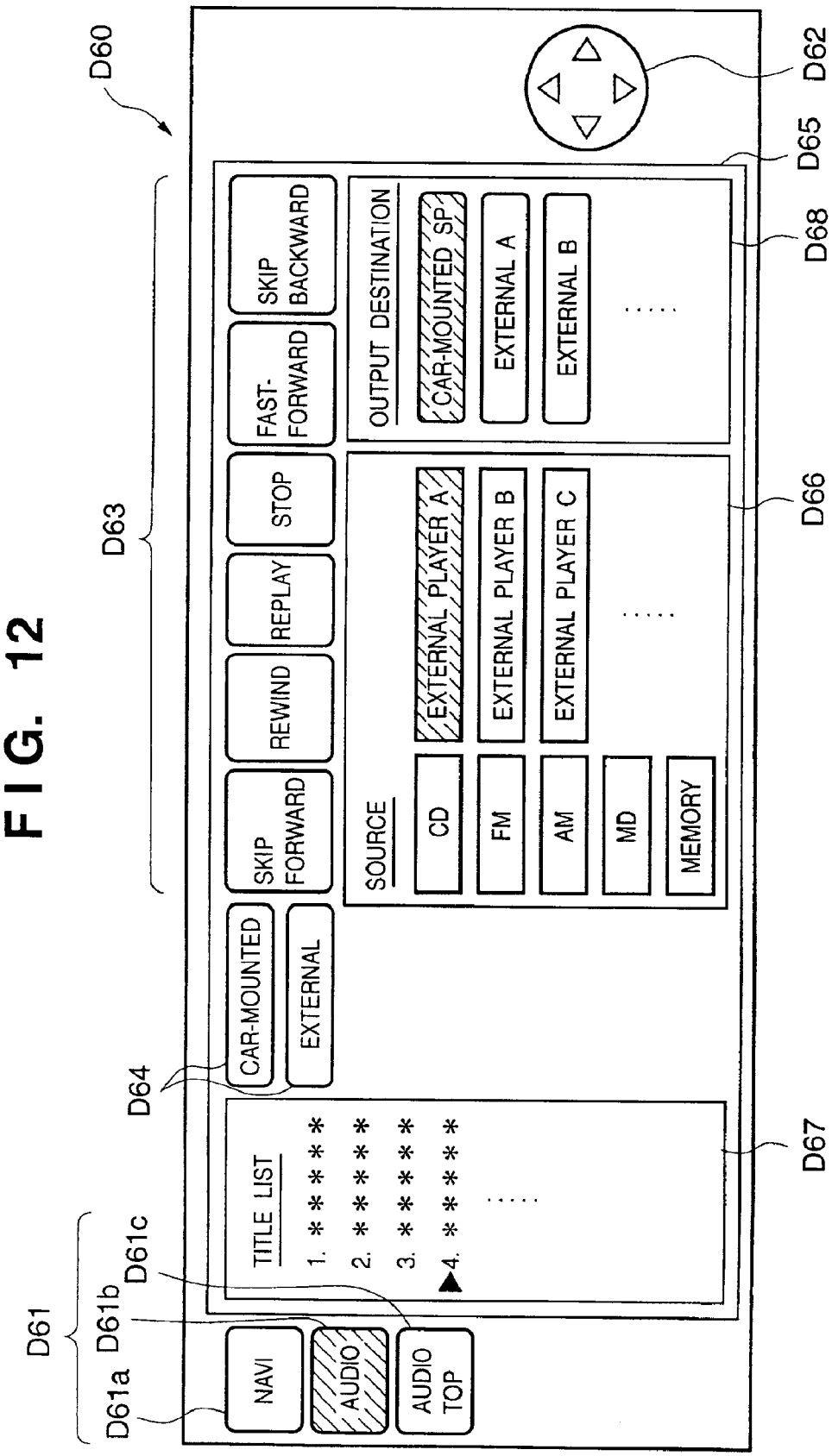
FIG. 12 is a display screen in a first modification of the first embodiment.

Then, FIG. 12 shows a display screen of this modification.

In this modification, display screen D60 shows a screen changeover switch D61 (NAVI switch D61a, AUDIO switch D61b, AUDIO TOP switch D61c) that switches between the display screens, a cross cursor/determination button D62 that determines a predetermined item, an audio operation switch D63 to enter an audio operation signal and an output changeover switch D64 that switches the output destination of the audio operation signal and allows the passenger to perform audio operations from the display screen D60.

That is, this modification constructs the display screen D60 with a touch panel allowing the passenger to enter audio operations to the audio apparatus 100 by directly touching the screen.

In this modification, the method of input operations by the audio apparatus 100 and control content are mostly the same as those in the embodiment above.

Figure 15:
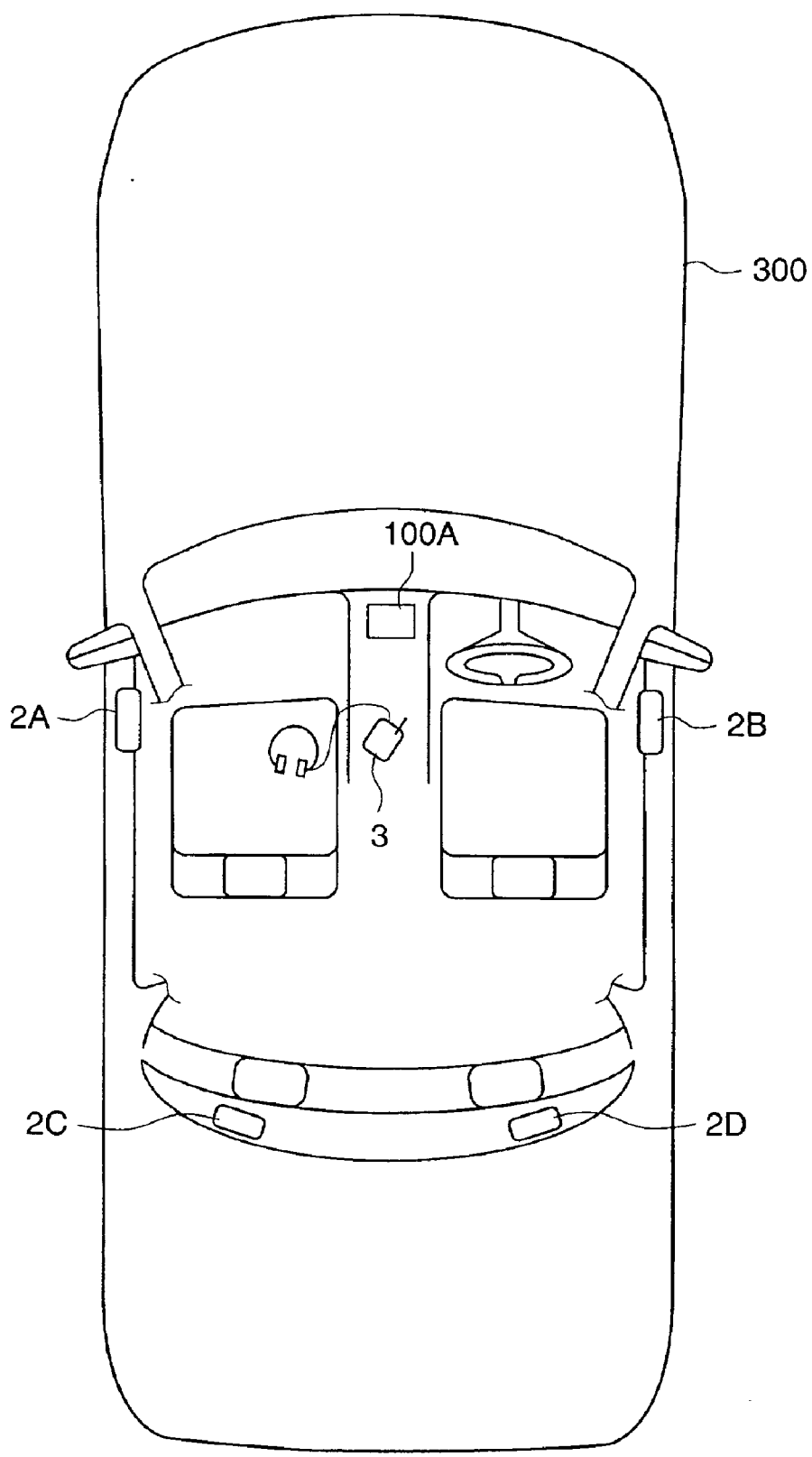
FIG. 15 illustrates a configuration example with an audio apparatus according to a second embodiment mounted in the car cabin.

That is, when the passenger selects the audio switch D61a with the screen changeover switch D61, the "AUDIO MENU" screen D65 appears in the center and for example, the passenger selects/determines the external player A in the Source "selection area D66 on the AUDIO MENU" screen, the 4th music in the "Music title list" selection area D67 and the speakers 28 in the "Output destination" selection area D67 with the cross cursor/determination button D62, and thereby the audio apparatus 100 determines the reproduction/output destination of the music (see FIG. 15).

Then, when an audio operation signal of reproduction and stop, etc. of the music data according to the input operation of the passenger is output from the audio operation switch D63, the audio apparatus 100 outputs the audio operation signal to the corresponding apparatus according to the setting condition of the output changeover switch D64.

Note, when the AUDIO TOP switch D61c is selected, various selection processing screens are displayed on the display screen D60 as in the case of the embodiment above allowing selection operation.

As described above, this modification is constructed so that the passenger can perform audio operations by directly touching the display screen, thus making it possible to eliminate audio operation switches, etc. from the operation panel 51 of the audio apparatus 100 set in the instrument panel. This makes the configuration of the operation panel 51 compact and allows the passenger to directly operate the audio apparatus while watching the display screen, thus improving operability.

<Second Modification of First Embodiment>

Then, a different modification of the identification method of the portable audio apparatuses will be explained based on FIG. 13 and FIG. 14.

As shown in FIG. 13, this modification adopts a communication method capable of providing directivity for a radio signal sent from the in-car radio antenna 34, thereby identifying portable audio apparatuses that exist in the vehicle.

FIG. 13 is a drawing to explain that the audio apparatus 100 in this modification sends a plurality of radio communication signals with directivity from the in-car radio antenna 34 in accordance with each seating position of the vehicle 1, thereby mutually carries out radio communication with the portable audio apparatuses that exist in the vehicle and identifies those portable audio apparatuses.

In this modification, the in-car radio antenna 34 installed almost in the center of the vehicle emits radio communication signals with directivity L1, L2, L3 and L4 around in four directions corresponding to the seating positions 2, 3 and 4 and carries out radio communication with the portable audio apparatuses.

As shown by the hatching areas in FIG. 13, these radio communication signals L1, L2, L3 and L4 are sent from the in-car radio antenna 34 so as to irradiate the total areas of the seats 2, 3 and 4 at their respective predetermined irradiation angles. Adopting such a configuration, this modification is constructed to allow the passengers to be seated to reliably search the portable audio apparatuses 200a and 200b no matter where the passengers put the portable audio apparatuses 200a and 200b and carry out radio communication.

As these radio communication signals L1, L2, L3 and L4 are sent, the audio apparatus 100 detects the portable audio apparatuses 200a and 200b at their respective irradiated seating positions, automatically identifies the detected portable audio apparatuses as apparatuses forming a radio communication network in the vehicle and at the same time sets the identified portable audio apparatuses as the apparatuses to/from which music data can be transmitted/received.

For example, when the portable audio apparatus 200a is searched and connected, through the radio communication signal L1 corresponding to the driver seat 2, the portable audio apparatus 200a can be identified as "External player A", and when the portable audio apparatus 200b is searched and connected through the radio communication signal L2 corresponding to the assistant seat 3, the portable audio apparatus 200b can be identified as "External player B".

Thus, this modification allows portable audio apparatuses to be identified through radio communication signals with directivity.

<Third Modification of First Embodiment>

Figure 14:
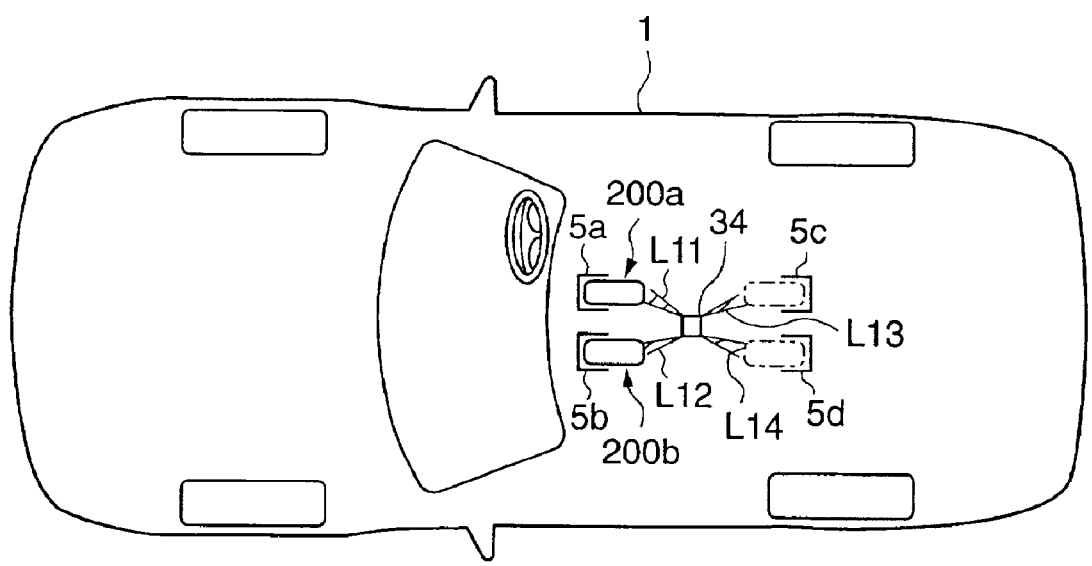
FIG. 14 is an outlined plan view of an automobile using radio communication signals directed to mount positions in a third modification of the first embodiment.

FIG. 14 is a drawing to explain that the audio apparatus 100 in this modification sends a radio communication signal with directivity from the in-car radio antenna 34 in accordance with the positions of mounts provided in the vehicle for the portable audio apparatuses, thereby mutually carries out radio communication with the portable audio apparatuses which exist in the vehicle and identifies those portable audio apparatuses.

In this modification, the in-car radio antenna 34 installed almost in the center of the vehicle emits radio communication signals L11, L12, L13 and L14 with directivity in directions corresponding to the positions of mounts 5a, 5b, 5c and 5d of the portable audio apparatuses set in the vehicle and carries out radio communication with the portable audio apparatuses.

As shown in FIG. 14, the positions of the mounts 5a, 5b, 5c and 5d are predetermined in the vehicle. For this reason, the in-car radio antenna 34 in this modification focuses the irradiation angles of the radio communication signals L11, L12, L13 and L14 as shown in the hatching areas in the same figure and pinpoints the irradiation thereof on the mounts 5a, 5b, 5c and 5d. Moreover, the audio apparatus 100 in this modification is constructed to carry out radio communication only when the portable audio apparatuses 200a and 200b are set on the mounts.

Also, in this modification, when these radio communication signals L1, L2, L3 and L4 are transmitted, the audio apparatus 100 detects the portable audio apparatuses 200a and 200b at the seating positions irradiated, automatically identifies the detected portable audio apparatuses as apparatuses making up a radio communication network in the vehicle and at the same time sets the identified portable audio apparatuses as the apparatuses to/from which music data can be transmitted/received.

For example, when the portable audio apparatus 200a is searched and connected through the radio communication signal L11 that irradiates the mount 5a near the driver seat, the portable audio apparatus 200a is identified as "External player A", and when the portable audio apparatus 200b is searched and connected through the radio communication signal L12 that irradiates the mount 5b near the assistant seat, the portable audio apparatus 200b is identified as "External player B".

Thus, this modification allows portable audio apparatuses to be identified through radio communication signals with directivity.

As in the case of the above embodiment, it is possible to perform audio control on transmission/reception of music data, etc. by identifying the portable audio apparatuses 200 as shown in the second and third modifications explained above.

Thus, the identification method of these portable audio apparatuses makes it possible to visually check the position of a portable audio apparatus that has been connected to the car-mounted audio apparatus, thus improving operability.

As described above, the first embodiment and its modification have the following effects.

This embodiment first sends music data retained in the portable audio apparatuses 200a and 200b to the audio apparatus 100 via radio communication and reproduces/outputs the music data in real time through the speakers 28 in the vehicle. This allows the music data retained in the relevant portable audio apparatuses to be reliably and easily reproduced/output from the speakers 28 via radio communication without the passengers bothering to set the portable audio apparatuses on the mounts.

This makes it possible to replay preferred music using music data in the portable audio apparatus that the passenger carries without downloading the music data from the Internet, thus improving operability and convenience and furthermore attaining cost reduction.

Especially, since the music data of the portable audio apparatuses 200 is reproduced/output in real time, it is not necessary to store a large volume of music data in the audio apparatus 100 and it is possible to reduce the volume of the information storage unit such as semiconductor memory necessary for the audio apparatus 100.

Furthermore, audio operations of the portable audio apparatuses 200a and 200b are possible by the passenger carrying out operations from the audio operation switches 107 of the audio apparatus 100. Thus, even if music data is retained in the portable audio apparatuses 200a and 200b, the passenger can carry out operations of the portable audio apparatuses 200a and 200b directly from the audio apparatus 100. Also when the driver carries out audio operations during driving, audio operations through the audio operation switches 107 of the audio apparatus 100 with high operability can also secure the safety.

Furthermore, this embodiment allows the passenger to freely select the mode of use of the portable audio apparatuses 200a and 200b in the vehicle by switching between a communication state in which music data is transmitted/received between the apparatuses 100, 200a and 200b, and a non-communication state without performing transmission/reception of music data between apparatuses using the internal/external changeover switch 209 of the portable audio apparatuses 200a and 200b.

Furthermore, this embodiment allows the passenger to visually check the physically invisible connection state of radio communication by visibly displaying the communication connection state of the audio apparatus 100 and portable audio apparatuses 200a and 200b through the connection situation D21 of the "Reception MENU" screen and reliably judge the connection state of the audio apparatus 100 and portable audio apparatuses 200a and 200b.

Furthermore, in this embodiment, if the passenger does not determine music source through the music source determination operation, all music data pieces of each portable audio apparatus are selected one by one and reproduced/output as music from the speakers 28 one by one, allowing the passenger to enjoy music data of all the portable audio apparatuses in the vehicle without selecting the music data every time.

Furthermore, this embodiment constructs a radio communication network made up of respective apparatuses by assigning identification addresses to a plurality of portable audio apparatuses 200a and 200b that exist within the radio communication range of the audio apparatus 100 and thereby identifying the apparatuses. This allows the audio apparatus 100 to reliably recognize which of the portable audio apparatuses 200a and 200b in such a radio communication network has sent the music data and control reproduction of the music.

Furthermore, in the second modification above, the portable audio apparatuses that exist at the seat positions are searched/connected by a plurality of radio communication signals with directivity in accordance with the seat positions in the vehicle, thus reliably identifying the portable audio apparatuses.

Especially, the passenger can visually check which portable audio apparatus at which passenger seat music data is transmitted/received to/from, thus improving operability.

Furthermore, in the third modification above, the portable audio apparatuses are identified through a plurality of radio communication signals with directivity in accordance with the positions of the mounts of the portable audio apparatuses provided in the vehicle, making it possible to identify the portable audio apparatuses when the portable audio apparatuses are set on the mount. Thus, the passenger can easily judge which portable audio apparatus on which mount music data is transmitted/received to/from and the audio apparatus 100 does not search/connect portable audio apparatuses other than those that exist on the mounts, preventing erroneous detection.

Furthermore, in this embodiment and its modification, the in-car radio antenna 34 is installed almost in the center of the vehicle, which can emit detection wave uniformly in the vehicle and can search/connect the portable audio apparatuses in the vehicle uniformly. Moreover, even if there are any portable audio apparatuses other than those of the passengers near and outside the vehicle, this embodiment and its modification can reduce the possibility of erroneous detection.

Furthermore, in this embodiment, the audio apparatus 100 receives a plurality of music data pieces sent from a plurality of portable audio apparatuses 200a and 200b, reproduces/outputs one music data piece as music from the speakers 28 and reproduces/outputs other music data pieces as music from the headphones of the portable audio apparatuses 200a and 200b. When a plurality of portable audio apparatuses 200a and 200b is connected by means of radio communication in the vehicle, different music data pieces are reproduced simultaneously from the speakers 28 and portable audio apparatuses 200a and 200b, and thereby passengers of the vehicle 1 can replay desired music individually.

Furthermore, in this embodiment, a plurality of portable audio apparatuses 200a and 200b are connected to the audio apparatus 100 with communication capability by means of radio communication, music data retained in one portable audio apparatus 200b is sent to the other portable audio apparatus 200a and the relevant music data can be reproduced/output as music from the other portable audio apparatus 200a. This allows the passenger to replay the music data retained in the portable audio apparatus 200b of another passenger as music using the own portable audio apparatus 200a.

Furthermore, in this embodiment, when the passenger selects/determines "Search" D24 from the "Reception MENU" screen and performs connection operation only at the initial audio control, it is possible to eliminate the possibility of erroneous connection even if other portable audio apparatuses enter into the communication range of the audio apparatus 100 during music control such as when the vehicle is traveling, thereby preventing disturbance of control.

On the other hand, while "Update" D25 is selected/determined on the "Reception MENU" screen during audio control, the audio apparatus 100 in this embodiment automatically performs connection operation at predetermined time intervals and can thereby eliminate the need for the passenger to perform connection operation every time a new portable audio apparatus is connected.

The method of controlling the audio apparatus in the above embodiments and their modifications is implemented by the CPUs inside these apparatuses executing the control program stored in the concentrated control unit 20 that performs system control of the audio apparatus 100 and portable audio apparatus 200, etc. Furthermore, providing such a control program stored in a program storage medium separately will also allow the control unit of another audio apparatus, etc. to execute the above-described control processing.

The first embodiment has been explained so far. The present invention is not limited to this embodiment, but includes any cases where portable audio apparatuses are carried into the vehicle, music data retained in those portable audio apparatuses is sent to the audio apparatus mounted in the vehicle via in-house radio communication and replayed in real time from speakers mounted in the vehicle. Its detailed configuration can be changed as appropriate without departing from the spirit and scope thereof.

[Second Embodiment]

Then, a second embodiment, which is based on the system configuration of the audio apparatus (audio system) according to the first embodiment above, will be explained. In the following explanations, overlapping explanations about the same configurations as those in the first embodiment will be omitted and explanations will be focused on characteristic sections of this embodiment.

This embodiment is a modification of the first embodiment above and characterized by the configuration of the apparatus mounted on the vehicle. This feature is summarized as follows: Instead of the subsystem made up of the audio apparatus 100 and speakers 28, etc. in the first embodiment, the second embodiment constructs a subsystem in the vehicle with an audio unit 100A and speaker units 2A to 2D, which will be described below, making it possible to carry out radio communication between components which make up the subsystem itself.

FIG. 15 illustrates a configuration example of an audio apparatus for a vehicle according to the second embodiment mounted in a car cabin.

In the same figure, a basic configuration of the audio apparatus for a vehicle according to this embodiment includes, in the car cabin of a vehicle 300, an audio unit 100A embedded in a center console, speaker units 2A to 2D embedded in accordance with the seats in the car cabin and can also include a portable audio terminal (portable audio apparatus) 3 according to the need of the passenger in addition to this basic configuration.

In this embodiment, a general configuration is used as an example in which the speaker units 2A and 2B are placed near the driver seat and assistant seat of the vehicle 300 and the speaker units 2C and 2D are placed behind the right and left rear seats, but the number and locations of the speaker units are not limited to the configuration example shown in FIG. 15 and can be determined as appropriate according to the layout and size, etc. of the seats in the car cabin.

Figure 16:
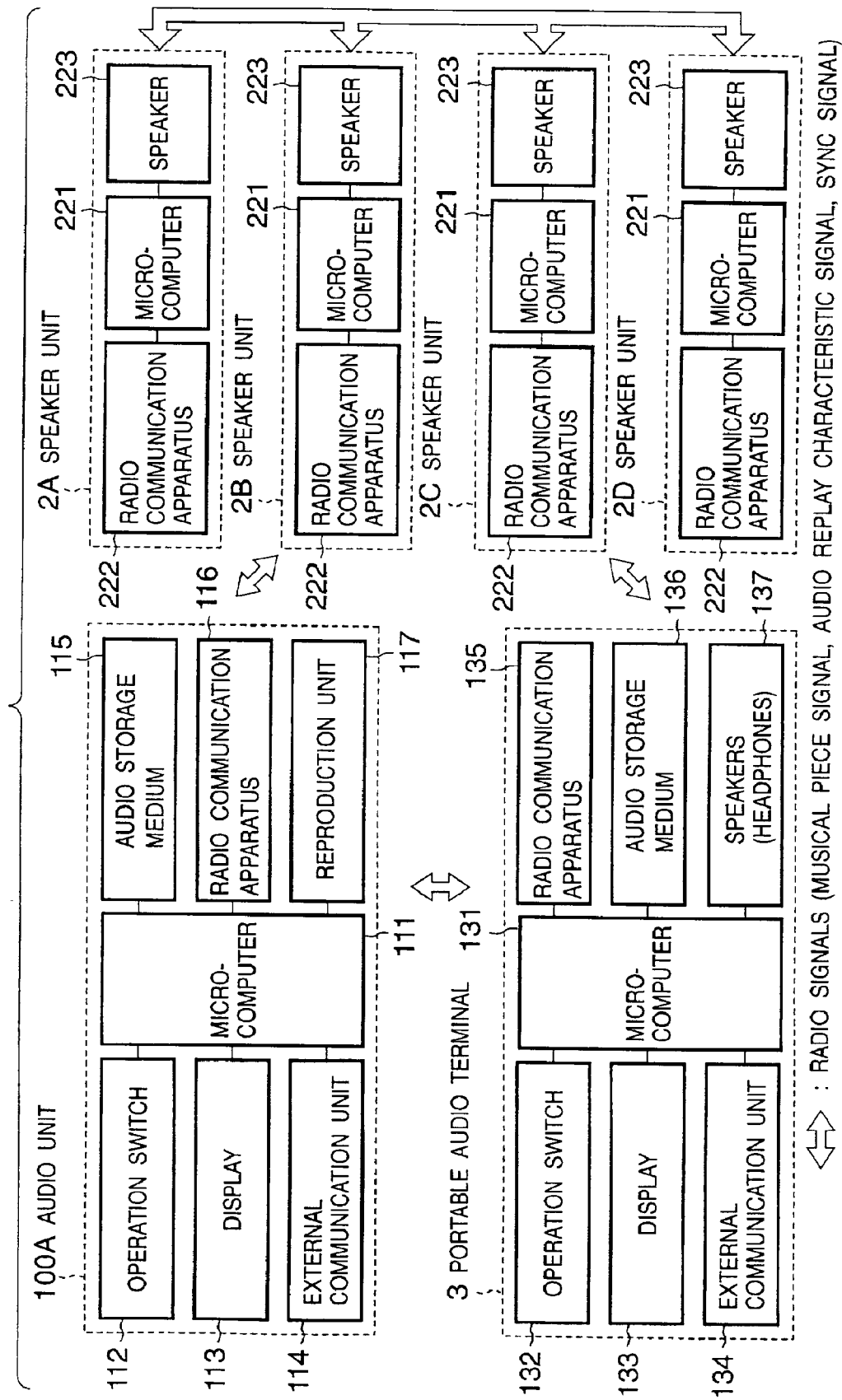
FIG. 16 illustrates a block configuration of components making up the audio apparatus according to the second embodiment and flows of radio signals between the components.

FIG. 16 shows a block configuration of components making up the audio apparatus for a vehicle in the second embodiment and flows of radio signals between those components.

<Audio Unit 100A>

First, the apparatus configuration of the audio unit 100A will be explained.

Reference numeral 112 denotes a plurality of operation switches 112 that allow the passenger to select contents such as music and voice to be replayed in the audio apparatus for a vehicle, set sound quality, sound volume, replay balance or select the replay unit such as CD and MD. Reference numeral 113 denotes a display that displays the setting state set by the operation switches 112 and the replay state set by the replay unit, etc. and can also be of a type provided with a touch panel so that the display also assumes part of the function of the operation switches 112 (a display example of the display 113 in this embodiment will be described later with reference to FIG. 23).

Reference numeral 114 denotes an external communication unit to acquire contents to be replayed by the audio apparatus for a vehicle from a communication apparatus outside the vehicle and it is possible to use a communication module capable of receiving data via a cable or by radio using infrared rays, etc. from a radio communication apparatus connectable to a mobile communication network in the city or information apparatus such as a personal digital assistant (PDA) mobile computer.

Reference numeral 115 denotes an audio storage medium (memory) that stores contents acquired from the outside via the external communication unit 114 and can also be configured as detachable. This audio storage medium 115 stores contents information such as music compressed beforehand according to a system like MP3, Solid Audio, Liquid Audio.

Reference numeral 116 denotes a radio communication apparatus that carries out radio communication with the speaker units 2A to 2D and the portable audio terminal 3 according to a predetermined communication protocol and this embodiment performs radio communication based on a Bluetooth system, which is an example of a short-distance radio communication system used within a range of distance of several tens of m.

Reference numeral 117 is a replay unit that reads contents information such as music stored beforehand in a storage medium such as CD, MD or cassette tape. Reference numeral 111 denotes a microcomputer that controls each block of the audio unit 100A above and thereby provides contents reproduction by the speaker units 2A to 2D and portable audio terminal 3, which will be described later, and operates according to a control program stored in memory.

Here, when contents information is sent to the speaker units 2A to 2D, the audio unit 100A sends the contents information compressed according to a predetermined system. That is, the microcomputer 111 sends compressed contents information stored in the audio storage medium 115 in the same data format from the radio communication apparatus 116, but in the case of contents information read from the replay unit 117, the microcomputer 111 compresses the contents information in a predetermined format such as MP3, Solid Audio and Liquid Audio above (in the case of MD, the same data compression format stored in MD can be used) prior to transmission thereof.

Note, that the audio unit 100A is driven by a power supply supplied from a battery (not shown) of the vehicle 300. Moreover, the individual structure and basic function itself of each block of the audio unit 100A above are presently generally known, and therefore their details will be omitted in this embodiment.

<Portable Audio Terminal 3>

Then, an apparatus configuration of the portable audio terminal 3 will be explained.

Reference numeral 132 denotes a plurality of operation switches that allows the user to select contents music (musical piece) or contents such as voice to be replayed in the portable audio apparatus, set the replay state such as replay start, stop and fast-forward of the selected contents, set sound quality, sound volume and replay balance. Reference numeral 133 denotes a display that displays the setting state and the replay state, etc. set by the operation switches 132.

Reference numeral 134 denotes an external communication unit to acquire contents to be replayed by the portable audio apparatus from a communication apparatus outside the vehicle and it is possible to use a communication module capable of receiving data via a cable or by radio using infrared rays, etc. from a radio communication apparatus connectable to a mobile communication network in the city or information apparatus such as a personal digital assistant (PDA) mobile computer.

Reference numeral 135 denotes a radio communication apparatus that carries out radio communication with the audio unit 100A and the speaker units 2A to 2D, according to the same predetermined communication protocol (Bluetooth system) as that of the audio unit 100A.

Reference numeral 136 denotes an audio storage medium (memory) that stores contents acquired from the outside via the external communication unit 134 and can also be configured as detachable. This audio storage medium 136 stores contents information such as music compressed beforehand according to a predetermined system like MP3, Solid Audio, Liquid Audio.

Reference numeral 137 denotes a speaker and/or headphone that outputs sound.

Reference numeral 131 denotes a microcomputer that controls each block of the portable audio terminal 3 above and thereby provides the replay function by the terminal as a single unit of replaying contents information stored in the audio storage medium 136 and provides contents replay by the speaker units 2A to 2D, which will be described later, and operates according to a control program stored in memory.

Here, when contents information is sent to the speaker units 2A to 2D, the portable audio terminal 3 sends the contents information compressed according to a predetermined system.

That is, the microcomputer 131 sends compressed contents information stored in the audio storage medium 136 in the same data format from the radio communication apparatus 135. When compressed contents information stored in the audio storage medium 136 is output as sound from the speakers (or headphones) 137, the microcomputer 131 decodes the compressed contents information according to the compression format and reproduces according to the decoded data.

Note, that the portable audio terminal 3 is driven by a power supply supplied from a battery (not shown) in the terminal. Moreover, the individual structure and basic function itself of each block of the portable audio terminal 3 above are presently generally known, and therefore their details will be omitted in this embodiment. Furthermore, the portable audio terminal 3 can also include a replay unit that reads contents information such as music pre-stored in a storage medium such as CD, MD or cassette tape.

<Speaker Units 2A to 2D>

Then, an apparatus configuration of the speaker units 2A to 2D will be explained.

Reference numeral 222 denotes a radio communication apparatus that receives a radio signal, etc. including contents (e.g. musical piece) from the audio unit 100A or portable audio terminal 3 according to the same predetermined communication protocol (Bluetooth system) as that of the audio unit 100A and portable audio terminal 3 and sends the radio signal received from the own speaker unit to the other speaker units at the request of other speaker units as will be described later.

Reference numeral 223 denotes a speaker that outputs contents such as musical piece reproduced from the radio signal received by the radio communication apparatus 222. Reference numeral 221 denotes a microcomputer that controls the radio communication apparatus 222 and speakers 223 above and thereby provides the function of communication with other speaker units and contents reproduction as will be described later and operates according to a control program stored in memory.

When the contents information compressed in a predetermined format is received from the audio unit 100A or portable audio terminal 3, the microcomputer 221 of the speaker units 2A to 2D decodes the contents information according to the protocol corresponding to the compression format and reproduces sound from the speaker 223 according to the decoded data.

Note, that the speaker units 2A to 2D are driven by a power supply supplied from a battery (not shown) of the vehicle 300. Moreover, the individual structure and basic function itself of each block of each speaker unit are presently generally known, and therefore their details will be omitted in this embodiment.

The arrowed lines in FIG. 16 conceptually show flows of radio signals transmitted/received between components such as the audio unit 10A, portable audio terminal 3 and speaker units 2A to 2D above.

The radio signals at least transmitted/received to implement this embodiment include signals (hereinafter referred to as "music signals") including information of contents (e.g., music) commonly sent to the speaker units (including the portable audio terminal 3), signals including individual audio replay characteristic information (hereinafter referred to as "audio replay characteristic signals") of each speaker unit corresponding to desired sound quality, sound volume, replay balance, etc. set by the passengers using the audio unit 100A and signals including sync information (hereinafter referred to as "synch signals")of individual sound output timing by the speaker units 2A to 2D.

These radio signals include not only the information content above to be sent but also identification information to identify the transmission source and transmission destination and predetermined transmission error determination codes, etc.

Note, that the radio communication system used in each component is not limited to Bluetooth, but any system can also be used if it allows high-speed and large volume data transfer in such a way that there will be no delay in transmission of contents information to be reproduced in a space of the vehicle room in which the audio apparatus for a vehicle is mounted.

In this embodiment, contents information is transmitted/received to/from the speaker units 2A to 2D compressed in the predetermined format above. However, if the radio communication system used allows high-speed and large volume data transfer, by sending music signals including decoded contents information from the audio unit 100A or portable audio terminal 3, a hardware or software module for implementing decoding processing can be omitted from the speaker units 2A to 2D.

<Contents Reproduction>

Then, the contents reproduction operation implemented when the above components each act will be explained with reference to FIG. 17 to FIG. 19A and FIG. 19B and FIG. 23.

Note, that the audio apparatus for a vehicle according to this embodiment can reproduce various kinds of contents (conversation, sports replay, news, etc.), but in the following explanations, most general musical pieces (music) will be taken as an example of typical contents.

First, a basic music reproduction operation in this embodiment will be outlined.

Figure 23:
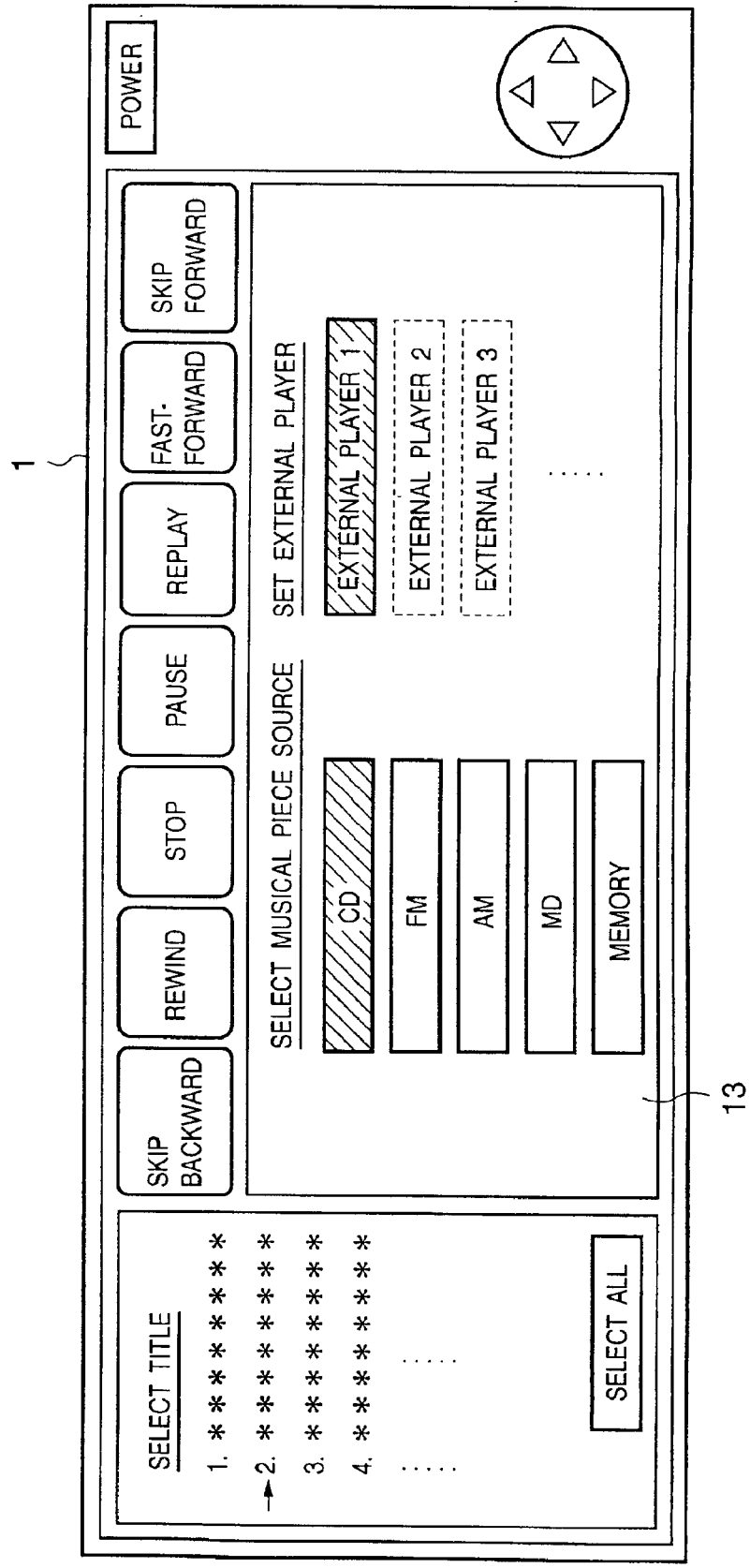
FIG. 23 illustrates a display example of a display 113 of the audio unit 100A.

FIG. 23 shows a display example of the display 113 of the audio unit 100A. When the passenger wants reproduction of musical pieces using the audio apparatus for a vehicle, the passenger operates the power switch and thereby makes the audio unit 100A display the setting screen in FIG. 23.

In this display screen, the passenger selects some desired music source from among a plurality of types of music sources to be replayed and registers the external player as required. Here, the music source denotes the source of information to replay musical pieces.

In the example shown in FIG. 23, CD is selected and the external player 1 is selected. Furthermore, in this embodiment, the portable audio terminal 3 is selected to be identifiable with an identification number, etc. as the external player 1 through the setting operation by the passenger from a screen (not shown) and when music signals are sent from the relevant terminal and audio unit 100A, the priority order in which the music signals should be replayed is set.

Then, according to the music source selection operation above, a list of CD musical pieces inserted in the replay unit 117 (CD player, in this case) beforehand is automatically displayed in the left area of the display and the passenger selects musical pieces to be replayed using the cursor key, etc. near the right end of the audio unit 100A.

Furthermore, the passenger can set audio replay characteristics such as sound quality, sound volume and replay balance (including the setting of a pseudo-silenced state, which will be described later) during voice output from the speaker units 2A to 2D individually for each speaker unit using the operation switches 112, which are not shown in FIG. 23 (Note, if no setting is performed, predetermined default settings are used)

Then, when the passenger performs operations such as "Replay", "Fast-forward" and "Stop" as required, the audio unit 100A sends music signals including information on the selected musical pieces and control signals including control information such as stop and fast-forward to the speaker units 2A to 2D and sends audio replay characteristic signals including audio reply characteristic information set by the passenger (or default) to each speaker unit individually.

Then, the speaker units 2A to 2D reproduce the music signals received from the audio unit 100A according to the audio replay characteristic signals and control signals received in the same way and outputs a replay signal created by reproduction as sound from the speakers 223.

At this time, in this embodiment, since the portable audio terminal 3 is registered as the external player 1 as shown above, if the relevant terminal is inside or near the car cabin of the vehicle 300, the headphone 137 can also reproduce the musical pieces of the same contents as those of the relevant speaker unit.

Moreover, in the order of reproduction of musical pieces previously set by the passenger from the audio unit 100A, for example, if the audio unit 100A is higher than the portable audio terminal 3, it is possible to output the musical pieces included in the music signals from the speaker units 2A to 2D by sending the music signals from the relevant terminal when the music signals are not sent from the relevant unit yet. In this case, the portable audio terminal 3 also sends an audio replay characteristic signal according to the setting regarding the replay characteristics set by the user from the relevant terminal. The music replay priority information set by this passenger can be sent from the audio unit 100A to each speaker unit at predetermined or undetermined intervals as a control signal including the priority information.

If the contents to be reproduced is a musical piece, for example, a delimitation (unit) of the amount of information when the music signal is sent from the audio unit 100A (or portable audio terminal 3) can be a unit of one musical piece or a plurality of musical pieces or a unit of a predetermined time of a few seconds or so to divide one musical piece into a plurality of portions. In the case of radio broadcasting, the unit is preferred to be a shorter time unit to secure real-time broadcasting. Any way, design can be conducted in such a way as to arrange the amount of information to be sent in predetermined units according to factors such as over what extent of time the frequency band used in the adopted radio communication system can be occupied by the audio apparatus for a vehicle according to this embodiment.

Figure 17:
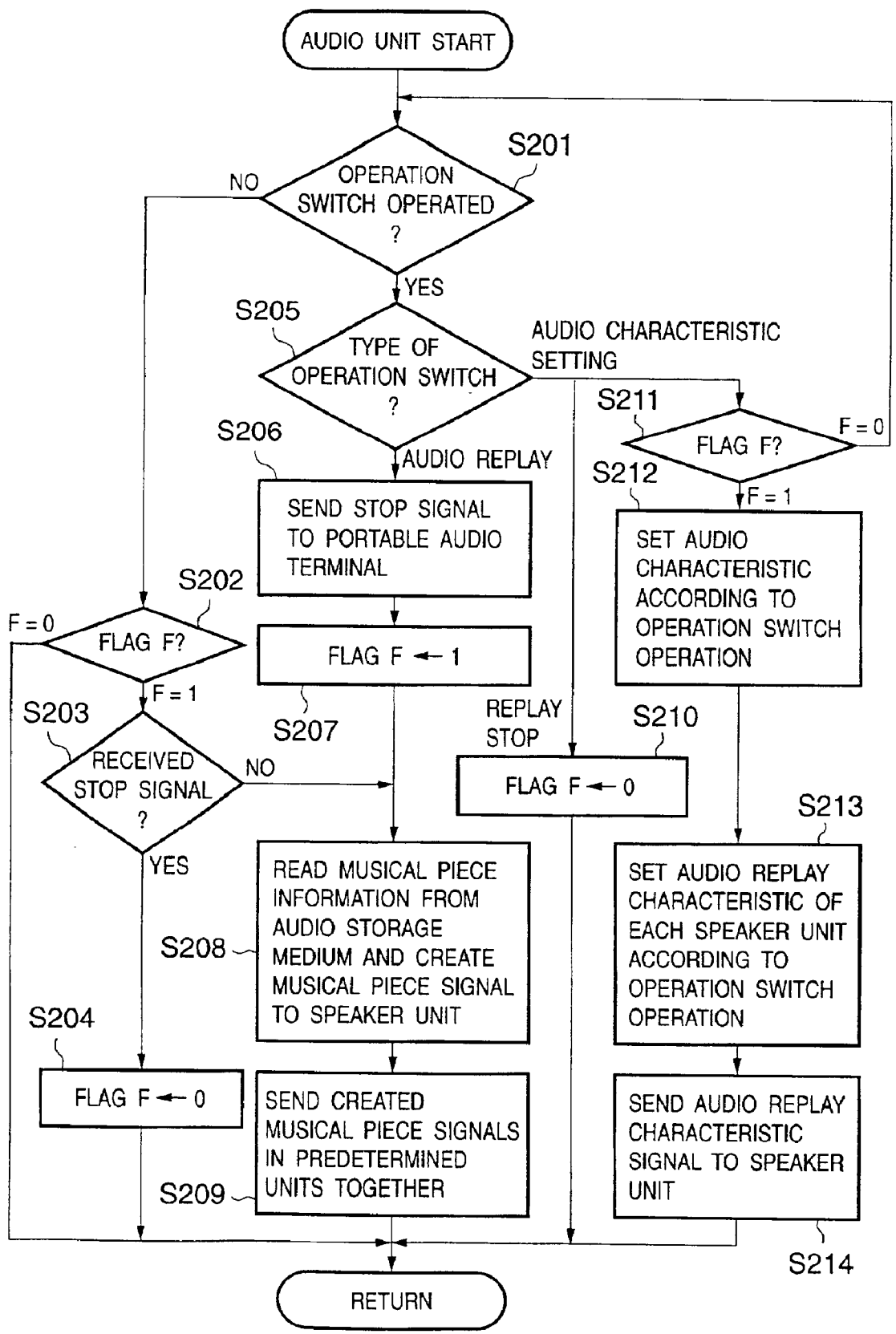
FIG. 17 is a flow chart of musical piece reproduction processing in an audio unit 100A in the second embodiment.

FIG. 17 is a flow chart of musical piece reproduction processing in the audio unit 100A in the second embodiment and shows the control procedure executed by the microcomputer 111 according to a control program pre-stored in memory.

In the same figure, in step S201: it is judged whether any of operation switches 112 is operated and if the judgment result is YES (operated), the process goes to step S205 and if the judgment result is NO (not operated), the process goes to S202.

Step S202 to step S204: Since none of the operation switches 112 is operated, the setting state of an internal flag F that indicates whether the audio unit 100A sends a radio signal or not is judged (step S202), and if this judgment results in F=1 (the radio signal is sent), it is judged whether a stop signal to stop the transmission of the radio signal from the relevant unit has been received from the portable audio terminal 3 or not (step S203), and if F=0 (transmission of the radio signal is stopped), the process returns to step S201.

Then, if the judgment in step S203 is NO (when no stop signal has been received), the process goes to step S208 to continue the transmission of the radio signal and if the judgment in step S203 is YES (the stop signal has been received), the internal flag is set to F=0 (step S204) and the process returns to step S201.

Step S205: The type of the operation switch whose operation has been detected in the judgment in step S201 from among the operation switches 112 is judged and if the operated switch is a switch related to audio replay ("Replay" switch illustrated in FIG. 23), the process goes to step S206 and if the operated switch is a switch related to replay stop ("Stop" or "Pause" switch illustrated in FIG. 23), the process goes to step S206, and if the operated switch is a switch related to the audio characteristic setting (switch not shown which allows the audio replay characteristic above), the process goes to step S211.

Step S206 and step S207: Since the audio unit 100A has instructed reproduction, a stop signal is sent to the relevant terminal (step S206) to prohibit a radio signal from being sent from the portable audio terminal 3 and the internal flag is set to F=1 (radio signal is sent) (step S207).

Step S208 to step S210: Before the switch about audio replay ("Replay" switch) is operated, the above selected musical pieces on the display in FIG. 23 are read from the audio storage medium 115 (or storage medium inserted into the replay unit 117), music signals including information on the musical piece (information of compressed data format) are created (step S208), the created music signals are sent in a predetermined unit together from the radio communication apparatus 116 according to a predetermined communication protocol (step S209) and the process returns to step S201.

Then, when the operation of the switch about replay stop ("Stop" switch) is detected in step S205, the internal flag is set to F=0 (transmission of the radio signal is stopped) (step S210) and the process returns to step S201.

That is, when the transmission of the music signal is started according to the operation of the "Replay" switch, the transmission of the music signals each containing a predetermined unit amount of information of the musical pieces continues until all selected musical pieces are sent until the operation of the switch about replay stop is detected.

Note, when the "Pause" switch is operated, the internal flag is held to F=1 (radio signal is sent), the transmission of the music signals can be temporarily stopped.

Step S211: When the operation of the switch about the setting of the audio characteristics is detected in step S205, the internal flag F setting state is judged (step S211), and if this judgment is F=1 (radio signal is sent), the process goes to step S212 to send the audio replay characteristic signal according to the relevant setting and if F=0 (transmission of the radio signal is stopped), the process returns to step S201.

Step S212 to step S214: In order to realize a desired sound field according to the operation of the switch about the operated audio characteristic setting, the setting information on the replay characteristic such as sound quality, sound volume and replay balance of the speaker units 2A to 2D of memory (not shown) in the microcomputer 111 is updated (step S212, step S213), the audio replay characteristic signal according to the updated setting information is individually sent to each speaker unit (step S214) and the process returns to step S201.

Here, the memory, which is not shown, of the microcomputer 111, stores location information of all the speaker units 2A to 2D and setting information on the audio replay characteristics to realize a general sound field at those locations (for example, when the relevant audio apparatus for a vehicle is mounted in the vehicle 300).

The setting information above is pre-stored as a default setting and the relevant setting information in step S212 and step S213 can be updated for the setting items such as sound quality, sound volume and replay balance except the location information of the relevant speaker units. Thus, no matter what characteristic is set, musical pieces are replayed with an optimal sound field according to the installation location of the speaker units 2A to 2D.

Moreover, the setting of the audio replay characteristic (sound field setting) using the operation switches 112 in the audio unit 100A includes choices like setting of sound volume to zero, setting for generating a pseudo-silenced state or setting for generating sound stripped of a specific frequency component, etc. for a desired speaker unit of the four speaker units.

The reason why these settings are possible in this embodiment is that as described above, the setting information about the audio replay characteristic includes location information of all the speaker units 2A to 2D, and so it is possible to realize replay characteristics taking into account the other speaker units when one speaker unit tries to replay sound with a desired sound field.

That is, in order to generate a pseudo-silenced state at a seat corresponding to a specific speaker unit, it is possible to change the phase of the sound output from the speaker unit opposite to the phase of the sound output from another speaker unit within the range in which the voice reaches the seat corresponding to the speaker unit and set the volume level based on the relevant location information. Furthermore, in order to generate sound stripped of a specific frequency component, it is possible to apply filtering before the speaker unit outputs the replay signal from the speaker 223.

Therefore, the setting information that can realize such a replay signal is sent to each speaker unit through the audio replay characteristic signal according to the setting of the audio replay characteristics in the audio unit 100A.

Figure 18:
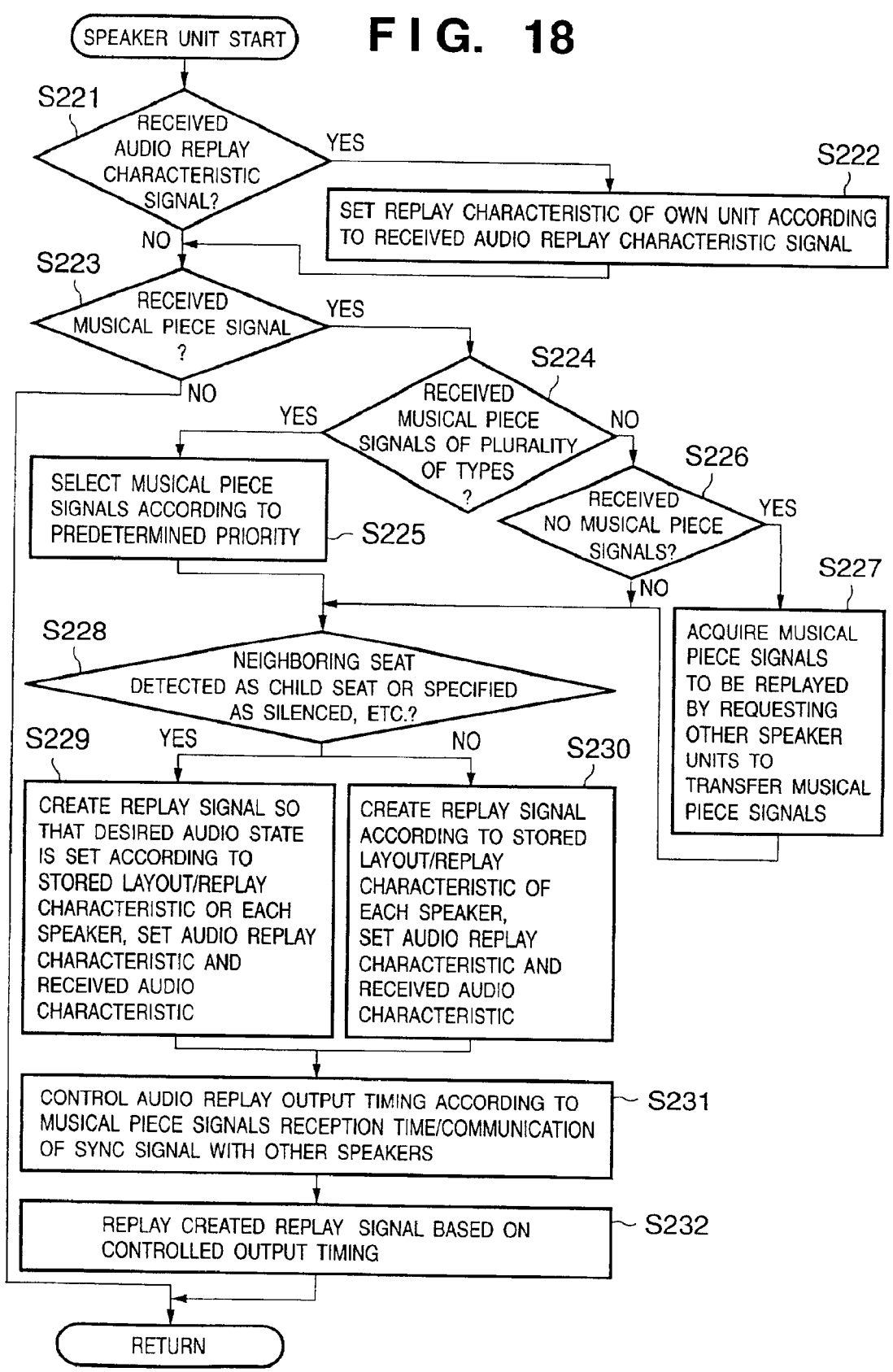
FIG. 18 is a flow chart of musical piece reproduction processing in speaker units 2A to 2D in the second embodiment.

FIG. 18 is a flow chart of musical piece replay processing in the speaker units 2A to 2D in the second embodiment and shows the control procedure executed by the microcomputer 221 of each speaker unit according to a control program pre-stored in memory.

In the same figure, in step S221 and step S222: it is judged whether an audio replay characteristic signal directed to the own speaker unit has been received from the audio unit 100A (step S221) and if the judgment result is NO (the relevant signal is not received), the process goes to step S223 and if the judgment result is YES (the relevant signal has been received), the audio replay characteristics of the own speaker unit are updated according to the setting information included in the received audio replay characteristics signal (step S222) and the process goes to S223.

Step S223, step S224: It is judged whether a musical signal is received from the audio unit 100A or portable audio terminal 3 or not (step S223), and if the judgment result is NO (the relevant signal is not received), the process returns to step S221. When the judgment result in step S223 is YES (the relevant signal has been received), it is judged whether the received musical signal is not sent from either one component of the audio unit 100A or portable audio terminal 3 or both are a plurality of types of musical signals including the musical signals sent from an external player, which is not set on the display screen in FIG. 23 or not (step S224).

Step S225: As the audio unit 100A sets priority, each speaker unit at least receives a transmitted control signal and thereby priority in replaying musical signals is set, and therefore if the judgment result in step S224 is YES (musical signals are received from a plurality of types of sources), any one of the plurality of types of received musical signals is selected according to the preset priority in this step (step S225) and the process goes to step S228.

Step S226, step S227: When the judgment result in step S224 is NO (a plurality of types of musical signals has not been received), it is judged whether no musical signal has been received (step S226) and if this judgment result is NO (one musical signal has been received within a predetermined time), the process goes to step S228. On the other hand, if the judgment result in step S226 is YES (when no musical signal has been received beyond the predetermined time), a control signal requesting a transfer of the musical signal is sent to the other speaker units (three speaker units other than the own speaker unit because in this embodiment, the musical information itself of a predetermined unit included in the musical signal has a content common to all the speaker units) and when the musical signals are transferred from the other speaker units to the own speaker unit in response to the control signal, the musical signals are received (step S227) and the process goes to step S228.

Step 228: It is judged whether special processing should be applied during sound output, for example, whether a child seat is attached to the seat corresponding to the own speaker unit, or whether a pseudo-silenced state is set.

More specifically, it is possible to judge whether a child seat is attached to the seat corresponding to the own speaker unit, for example, using a general system such as a detection system based on the output signal of an ultrasonic sensor provided in the car cabin or a detection system that detects a signal transmitted from an oscillator provided at the child seat from an antenna embedded in each seat and detects the child seat based on the size of the detected signal, and it is possible to receive a control signal including information expressing the detection state from the audio unit 100A at predetermined or undetermined intervals.

Furthermore, it is possible to judge whether a pseudo-silenced state is set or not by referencing the audio replay characteristic updated in step S222.

Step S229: Since it is judged in step S228 that special processing is required, in this step, a musical signal including an amount of information of a predetermined unit whose reception is detected in step S223 (or acquired from another speaker unit) is decoded according to a decoding protocol that conforms to the protocol at the time of compression and converted to a replay signal (that is, a signal of opposite phase realizing a pseudo-silenced state, signal of sound level 0 or signal with a predetermined frequency component filtered out, etc.) with reference to the audio replay characteristic updated in step S222 according to a desired sound field set by the audio unit 100A. This allows the passenger seated on a specific seat to drive the speaker unit corresponding to the seat in a condition according to his/her preference, for example, to set the speaker unit in a pseudo-silenced state in the case of a seat to which a child seat is attached or set the speaker unit to only output sound that will not adversely affect the child.

Step 230: Since it is judged in step S228 that special processing is not required, in this step, a musical signal including an amount of information of a predetermined unit whose reception is detected in step S223 (or acquired from another speaker unit) is decoded according to a decoding protocol that conforms to the protocol at the time of compression and converted to a replay signal with reference to the audio replay characteristic updated in step S222 according to a desired sound field set by the audio unit 10A.

Step S231 and step S232: At the time of reception of the musical signal received this time or based on a sync signal common to the speaker units sent by a predetermined speaker unit, the timing of outputting the replay signal created in step S229 or step S230 from the speaker 223 of the own speaker unit is adjusted (step S231) and the relevant replay signal is output as sound from the speaker 223 (step S232) at the adjusted output timing and the process returns to step S221.

Figure 19A:
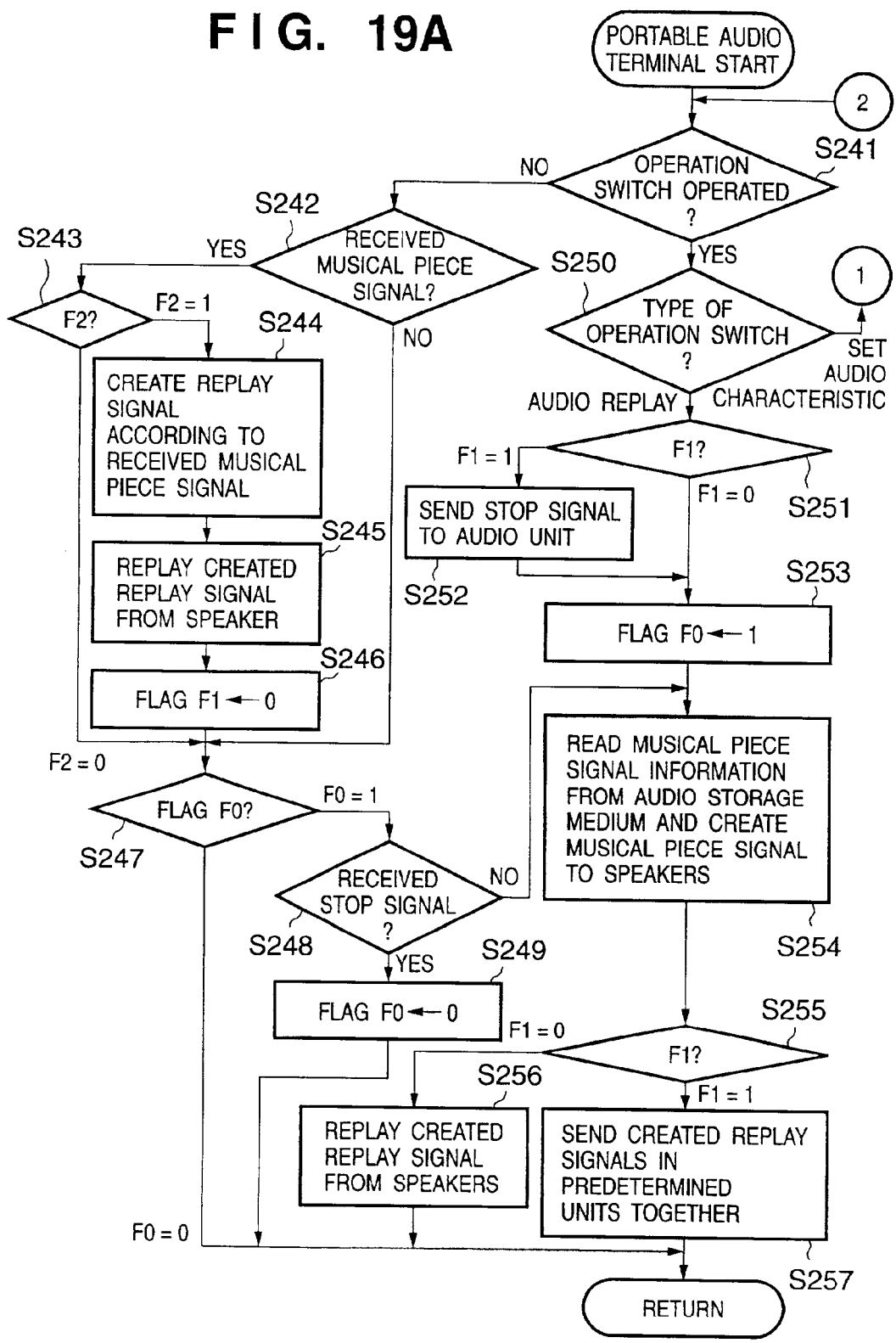
FIG. 19A and FIG. 19B are flow charts of musical piece reproduction processing in a portable audio terminal 3 in the second embodiment.
Figure 19B:
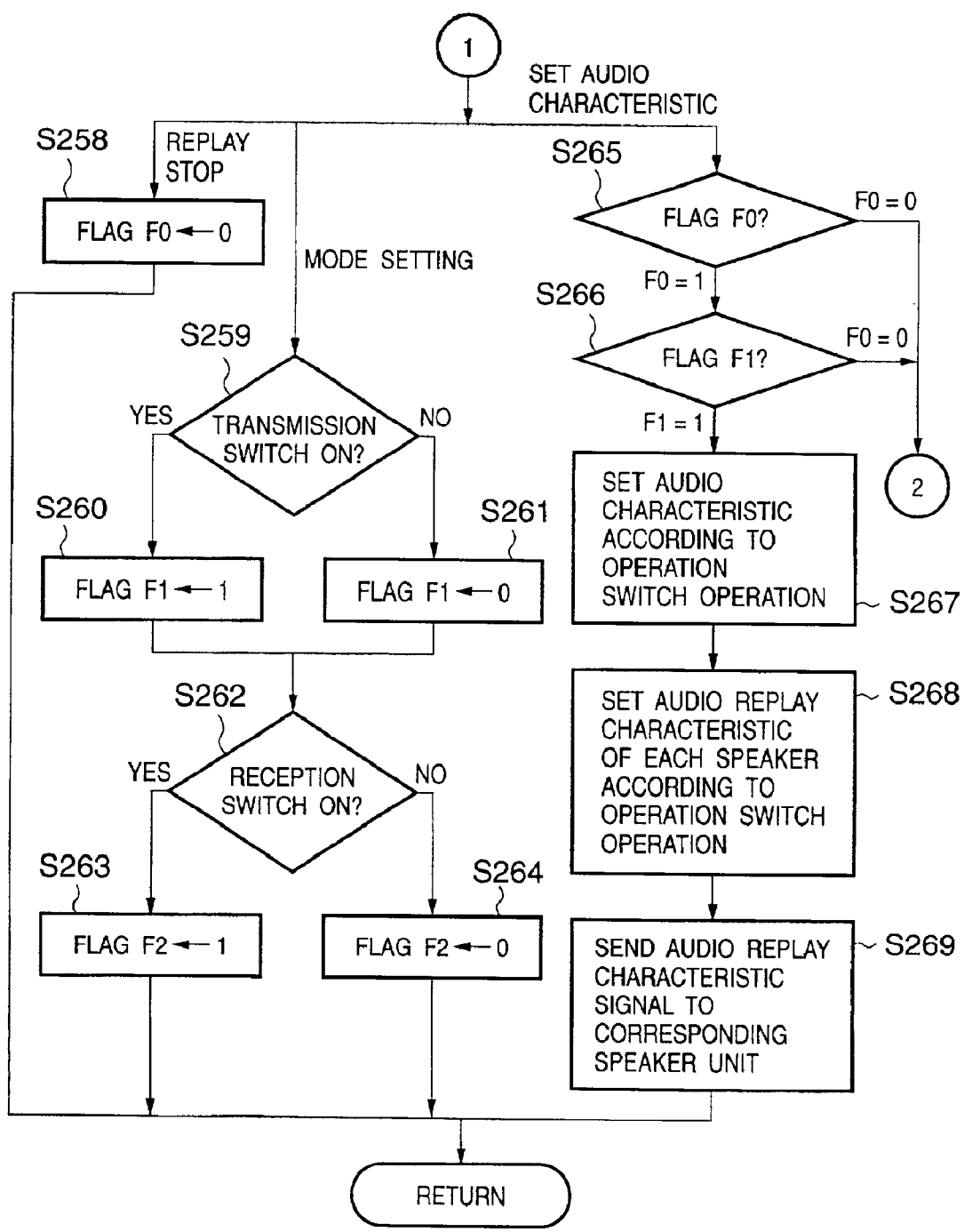

FIG. 19A and FIG. 19B are flow charts of the music replay processing in the portable audio terminal 3 according to the second embodiment and show the control procedure carried out by the microcomputer 131 according to a control program pre-stored in memory.

In the same figure, in step S241: It is judged whether any of the operation switches 132 has been operated, and if the judgment result is YES (operated), the process goes to step S250 and if the judgment result is NO (not operated), the process goes to step S242.

Step S242, step S243: It is judged whether a musical signal has been received from the audio unit 10A, and if the judgment result is NO (the relevant signal has not been received), the process goes to step S247 and if the judgment result is YES (the relevant signal has been received), the setting state of an internal flag F2 that indicates whether reception of the musical signal from the outside (audio unit 100A) is possible or not (step S243) is judged, and if the judgment result is F2=0 (reception of the relevant signal is prohibited), the process goes to step S247 and if F2=1 (reception of the relevant signal is allowed), the process goes to step S244.

Step S244 to step S246: Since the setting state of the internal flag F2 is F2=1, the received musical signal is converted to a replay signal (step S244) according to the replay characteristic preset by the user of the portable audio terminal 3, the replay signal is output as sound to the speaker (headphone) 137 (step S245), the setting state of an internal flag F1 that indicates whether the musical signal including the musical piece information read from the audio storage medium 136 by the relevant terminal should be sent independently or not is set to F1=0 (transmission of the relevant signal is prohibited) (step S246) and the process goes to step S247.

Step S247 to step S249: The setting state of an internal flag F0 that indicates whether a radio signal is sent from the portable audio terminal 3 or not is judged (step S247) and if the judgment result is F0=1 (the radio signal is sent), it is judged whether a stop signal instructing that the transmission of the radio signal from the relevant terminal should be stopped has been received from the audio unit 100A or not (step S248) and if F0=0 (transmission of the radio signal is stopped), the process returns to step S241.

If the judgment result in step S248 is NO (the stop signal has not been received), the process goes to step S254 to continue the transmission of the radio signal and if the judgment result is YES (when the stop signal has been received), the internal flag F0 is set to F0=0 (step S249) and the process returns to step S241.

Step S250: The type of the operation switch of the operation switches 132, which is detected to have been operated in the judgment in step S241, is judged and if the operated switch is the switch about audio replay ("Replay" switch), the process goes to step S251, and if it is the switch about replay stop ("Stop" or "Pause" switch), the process goes to step S258, and if it is the switch about mode setting, the process goes to step S259, and if it is the switch about audio characteristic setting, the process goes to step S265.

Step S251 and step S252: Since the operation switch of the portable audio terminal 3 has instructed a replay, the setting state of the internal flag F1 is judged and if this judgment result is F1=0 (transmission of the musical signal from the relevant terminal is prohibited), the process goes to step S253, and if F1=1 (transmission of the musical signal from the relevant terminal is allowed), a stop signal is sent to the relevant unit to prohibit the radio signal from being sent from the audio unit 100A (step S252) and the process goes to step S253.

Step S253: The internal flag F0 is set to F0=1 (radio signal is sent) and the process goes to step S208.

Step S254: Before the switch about audio replay ("Replay" switch) is operated, the musical piece selected by the user is read from the audio storage medium 136 and a musical signal including the information on the musical piece is created.

Step S255 to step S258: The setting state of the internal flag F1 is judged (step S255), and if the judgment result is F1=0 (transmission of the musical signal from the relevant terminal is prohibited), the musical signal created in step S254 is output as sound to the speaker (headphone) 137 of the relevant terminal (step S256) and if F1=1 (transmission of the musical signal from the relevant terminal is allowed), the musical signals created in step S254 are arranged in a predetermined unit and sent from the radio communication apparatus 135 according to a predetermined communication protocol (step S257) and the process returns to step S241.

Then, when an operation of the switch about replay stop ("Stop" switch) is detected in step S250, the internal flag F0 is set to F0=0 (transmission of the radio signal is stopped) (step S258) and the process returns to step S241.

That is, when the internal flag F0=0 (transmission of the radio signal is stopped) if the internal flag F1=1, once the transmission of the musical signals is started according to the operation of the "Replay" switch until an operation of the switch about replay stop is detected, musical signals each including a predetermined unit amount of musical piece information are sent until all the selected musical pieces are sent. Furthermore, if the "Pause" switch is operated while the musical signals are being sent, it is possible to temporarily stop the transmission of the musical signals while holding the internal flag F0=1 (radio signal is sent). Then, when the internal flag F1=0, the musical pieces independently replayed by the portable audio terminal 3 are output from the speaker (headphone) 137.

Step S259 to step S261: Since an operation of the switch about mode setting is detected in step S250, it is judged whether the operation has set the transmission switch to ON (step S259), and the state of the internal flag F1 that indicates whether transmission of the musical signals from the relevant terminal is possible or not is set according to the judgment (F1=1 when the relevant switch is ON: step S260, F1=0 when the relevant switch is OFF: step S261).

Step S262 to step S264: Since an operation of the switch about mode setting is detected in step S250, it is judged whether the operation has set the reception switch to ON (step S262), and the state of the internal flag F2 that indicates whether reception of the musical signals from the audio unit 100A is possible or not is set according to the judgment (F2=1 when the relevant switch is ON: step S263, F2=0 when the relevant switch is OFF: step S264).

Step S265, step S266: When an operation of the switch about audio characteristic setting is detected in step S250, the setting states of the internal flags F0 and F1 are judged and if F0=F1=1, the process goes to step S268 and if F0=0, or F0=1 and F1=0, the process returns to step S241.

Step S267 to step S269: In order to realize a desired sound field according to the operation of the operated switch about the audio characteristic setting and in order to realize a desired sound field according to the setting information on the replay characteristics such as sound quality, sound volume and replay balance of the speaker units 2A to 2D of memory (not shown) in the microcomputer 131, the setting information on the replay characteristics such as sound quality, sound volume and replay balance of the speaker units 2A to 2D of memory (not shown) in the microcomputer 131 is updated (step S267, step S268), and the audio replay characteristic signal according to the updated setting information is sent to each speaker unit individually (step S269) and the process returns to step S241.

According to this embodiment described above, it is possible to discard cables connecting the audio unit 100A and speaker units 2A to 2D and make mounting of each component in the car cabin easier. This eliminates the need for the designer of the vehicle to consider the cabling locations or operability of cabling, thus improving the degree of freedom of design.

[Third Embodiment]

Then, a third embodiment, which is based on the audio apparatus for a vehicle according to the second embodiment above, will be explained. In the following explanations, overlapping explanations about the same configurations as those in the second embodiment will be omitted and explanations will be focused on characteristic sections of this embodiment.

In the speaker units shown in FIG. 15, this embodiment groups, for example, the speaker units 2A and 2B corresponding to the driver seat and assistant seat and the speaker units 2C and 2D corresponding to the right and left rear seats, and replays musical pieces differing from one group to another. When such grouping is set, it is possible to allow the passengers to arbitrarily set a group including at least one speaker unit from the operation switches 112 of the audio unit 100A and from a predetermined display screen (not shown) using the display 113.

Furthermore, this embodiment allows the passenger to select a musical piece source or a musical piece to be replayed for every group set by the passenger by displaying the display screen illustrated in FIG. 23 for every group.

Figure 20:
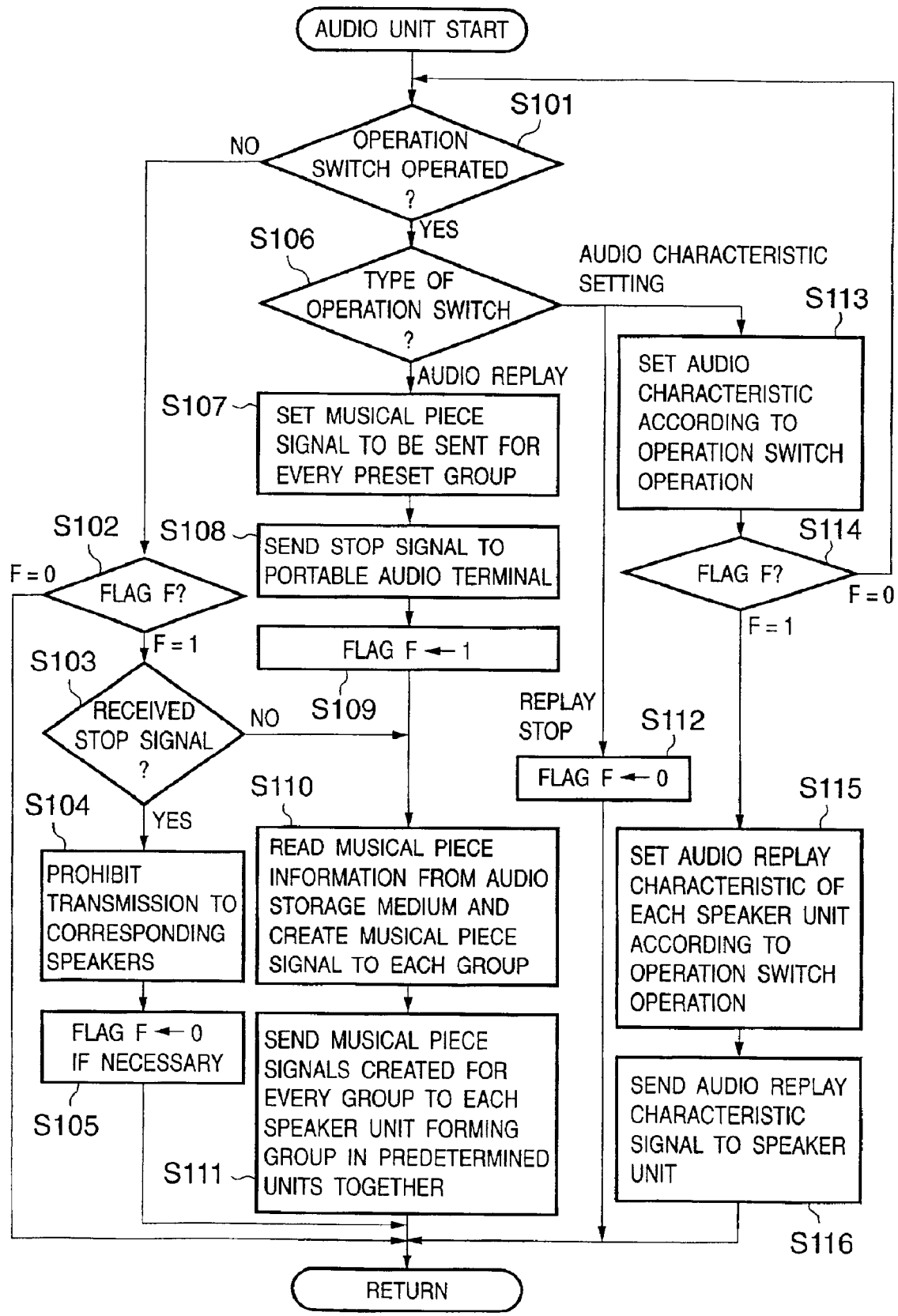
FIG. 20 is a flow chart of musical piece reproduction processing in an audio unit 100A in a third embodiment.

FIG. 20 is a flow chart of music replay processing in the audio unit 100A in the third embodiment, and since the basic processing configuration is almost the same as the flow chart in FIG. 17 described in the second embodiment, the characteristic processing in this embodiment will be explained.

In this embodiment, the audio unit 100A needs to send musical signals differing from one preset group to another. Therefore, in this embodiment, when an operation of the switch about audio replay is detected in step S106 before a stop signal is sent to the portable audio terminal 3 in step S108, a selected musical piece is set for every preset group in step S107 prior to setting the internal flag F to 1.

Then, in step S110 and step S111, musical piece information for every group is read from the audio storage medium 115, etc., their respective musical signals are created and those musical signals are sent to each speaker unit that makes up each group by a predetermined unit amount. At this time, the audio unit 100A includes the identification information of the group to which each speaker unit belongs in the musical signal to be sent.

Furthermore, when the audio replay characteristic is allowed to be set for every group, it is possible to send an audio replay characteristic signal according to the setting in step S115 and step S116.

Figure 21:
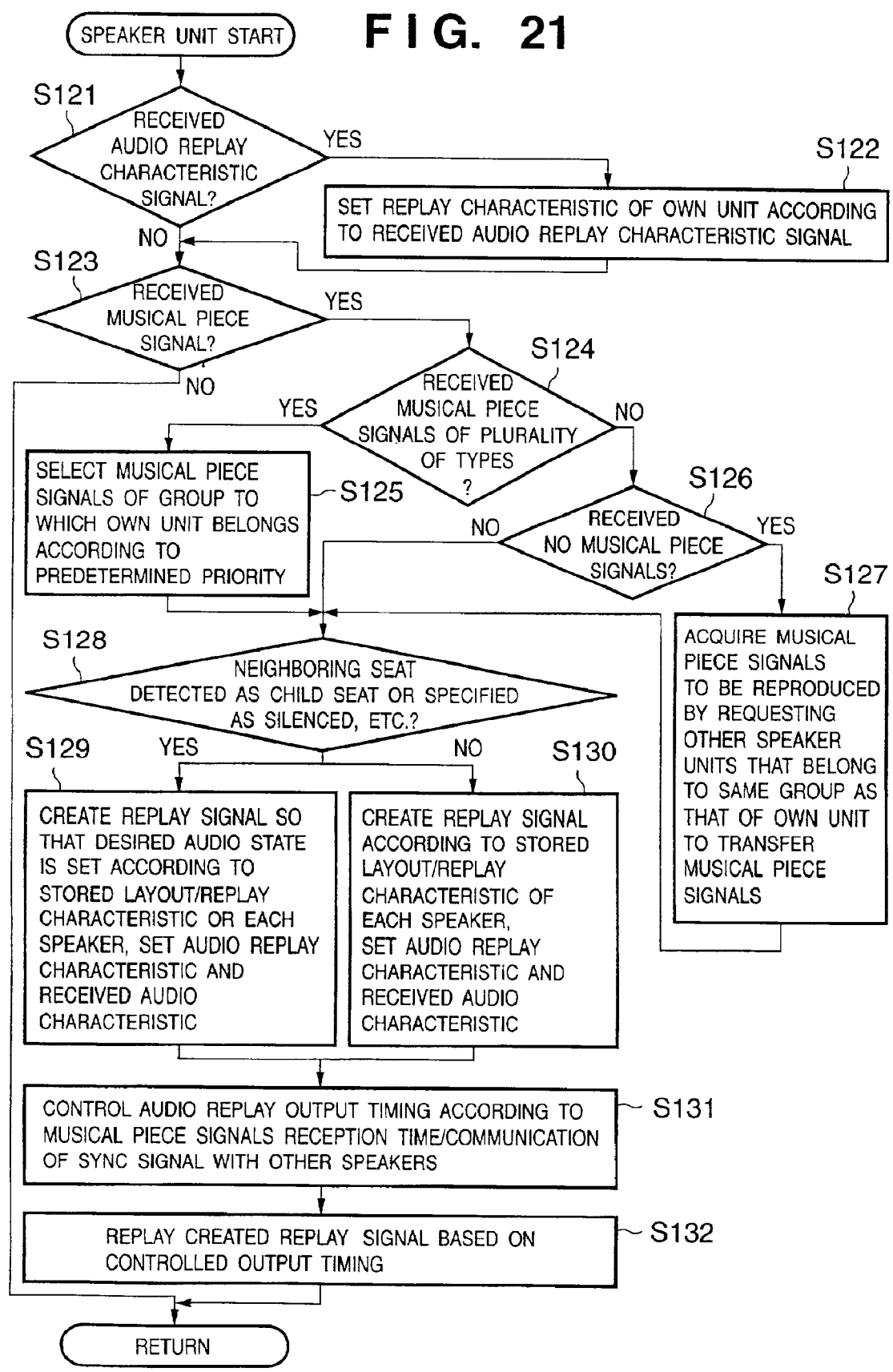
FIG. 21 is a flow chart of musical piece reproduction processing in speaker units 2A to 2D in the third embodiment.

FIG. 21 is a flow chart of music replay processing in the speaker units 2A to 2D in the third embodiment, and since the basic processing configuration is almost the same as the flow chart in FIG. 18 described in the second embodiment, the characteristic processing in this embodiment will be explained.

When a plurality of types of musical signals is received in step S124, in step S125, the speaker units 2A to 2D perform processing of selecting musical signals according to preset replay priority in the same way as in the second embodiment and at the same time selects a musical signal from among the received musical signals, including the identification information of the group to which the own unit belongs.

Then, when it is not possible to receive musical signals in step S126, it is necessary to select the musical signal including the identification information of the group to which the own speaker unit belongs from among the musical signals received as a result of requesting other speaker units for musical signals in step S127. Or when another speaker unit of the group to which the own speaker unit belongs can be recognized by a plurality of musical signals received so far, it is possible to directly request another speaker unit that belongs to the same group to transfer the musical signal.

Figure 22A:
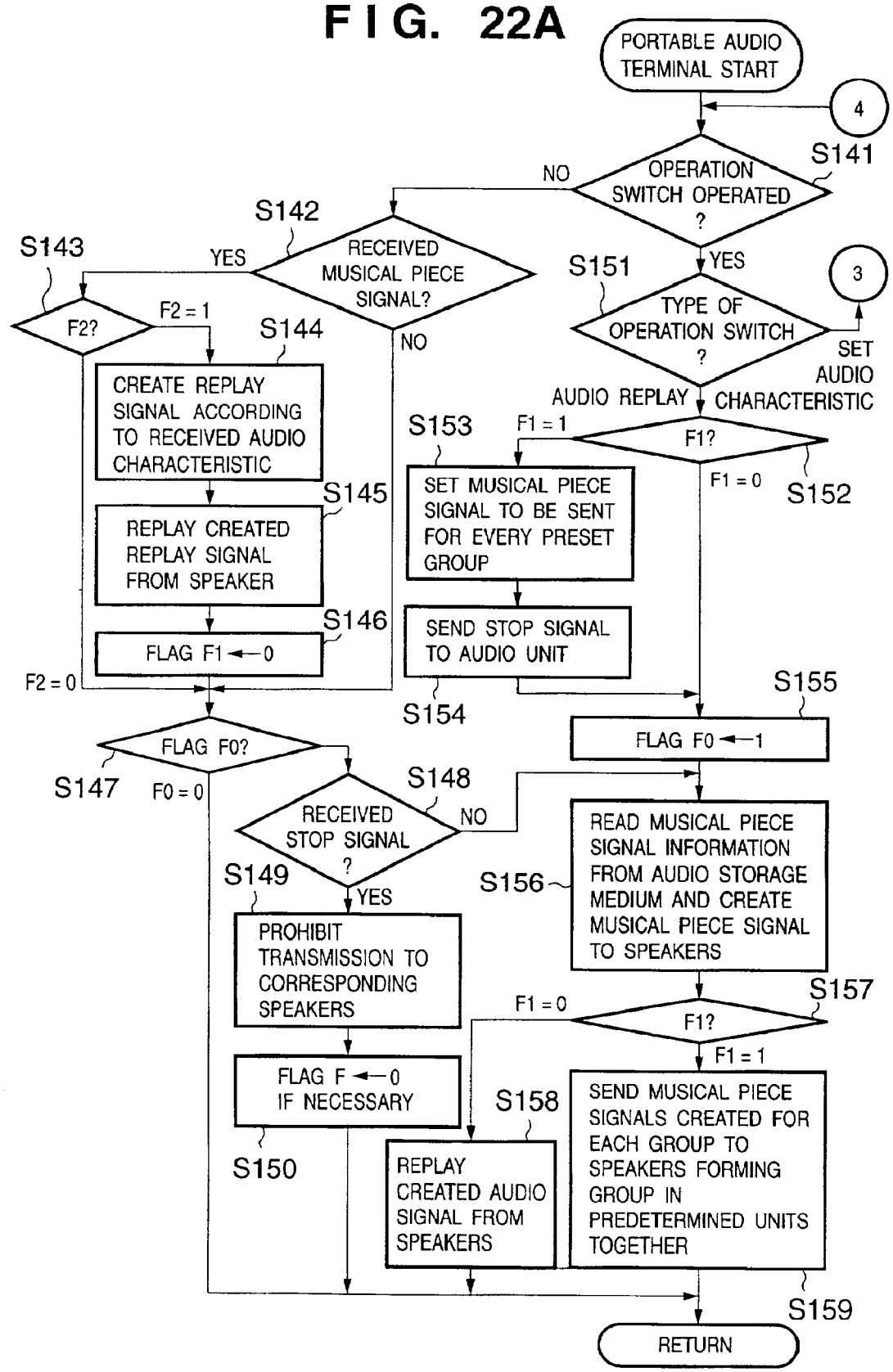
FIG. 22A and FIG. 22B are flow charts of musical piece reproduction processing in a portable audio terminal 3 in the third embodiment.
Figure 22B:
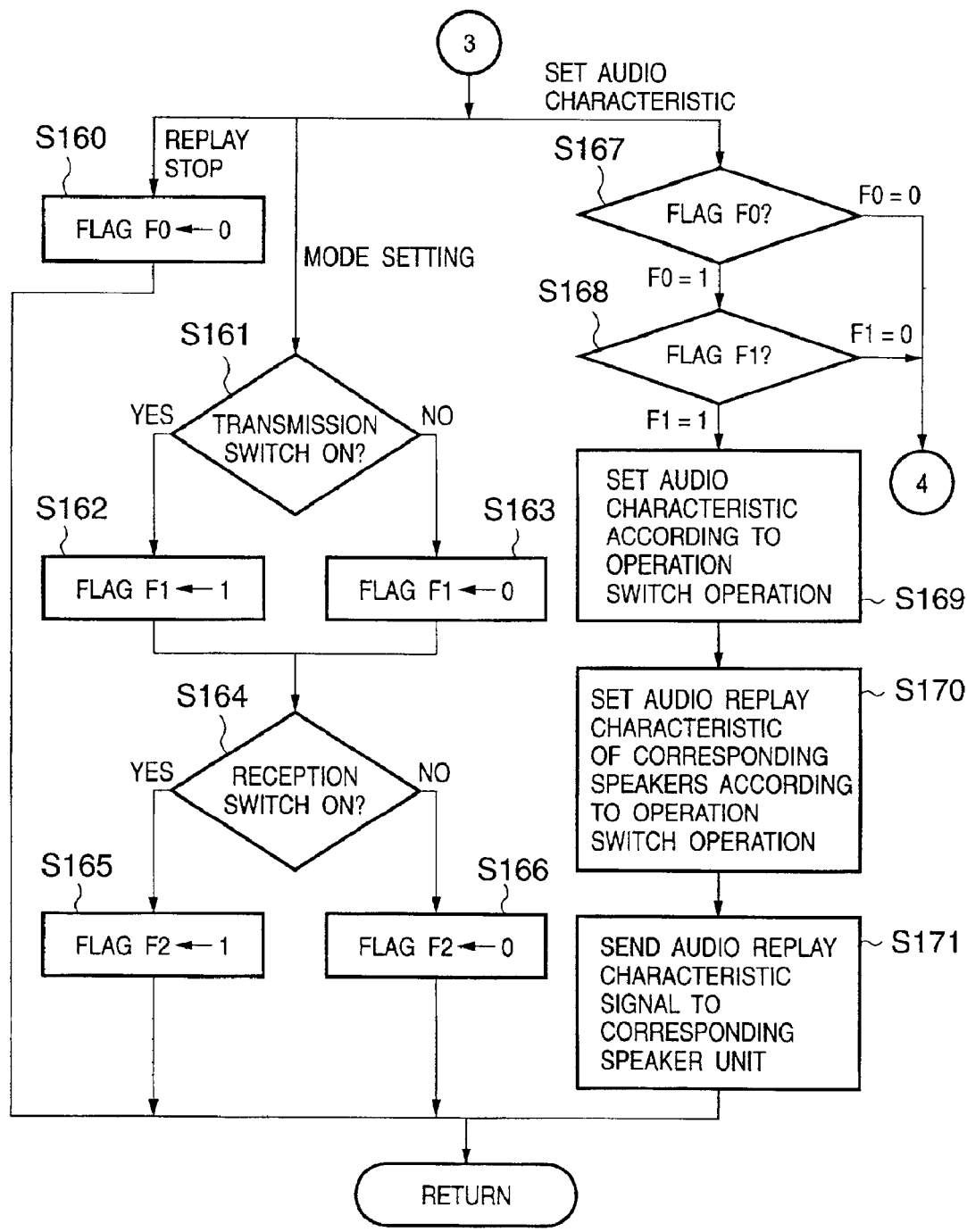

FIG. 22A and FIG. 22B are flow charts of music replay processing in the portable audio terminal 3 in the third embodiment, and since the basic processing configuration is almost the same as the flow charts in FIG. 19A and FIG. 19B described in the second embodiment, the characteristic processing in this embodiment will be explained.

As in the case of the above-described audio unit 100A, the portable audio terminal 3 needs to send musical signals differing from one preset group to another in this embodiment. Therefore, when an operation of the switch about audio replay is detected in step S151 and the judgment result in step S152 is the internal flag F1=1 (transmission of musical signals from the relevant terminal is allowed), this embodiment sets musical pieces selected for every preset group in step S153 before a stop signal is sent to the audio unit 100A in step S154.

Then, in step S156 and step S159, musical piece information for every group is read from the audio storage medium 136, etc., their respective musical signal are created and those musical signals are sent to each speaker unit that makes up each group by a predetermined unit amount. At this time, the portable audio terminal 3 includes the identification information of the group to which each speaker unit belongs in the musical signal to be sent.

Furthermore, when the audio replay characteristic is allowed to be set for every group, as in the case of the above-described audio unit 100A, it is possible to send an audio replay characteristic signal according to the setting in step S170 and step S171.

This embodiment allows individual passengers to listen to contents according to their preference in set group units and is ideally applicable to a vehicle with a large room such as a wagon car and bus.

The second and third embodiments above describe the audio unit 100A as a stationary type as shown in FIG. 15, but the present invention is not limited to such a system configuration. If the audio unit 100A is implemented as a terminal that the passenger can carry with him/her, that terminal can be carried into the vehicle by the passenger, making it possible to transfer musical signals to be replayed to a plurality of speaker units via radio communication as described above, eliminating a troublesome operation required in the above stationary type audio unit 100A to secure (transfer) musical piece information to the audio unit 100A before musical pieces are replayed, etc., thus improving operability.

The second and third embodiments above provide an easy-to-mount audio apparatus for a vehicle, its contents reproduction method and sound reproduction apparatus.

That is, the second and third embodiments above can discard cables connecting the audio unit 100A and a plurality of speaker units 2A to 2D and simplify mounting in the vehicle. This eliminates the need for the designer of the vehicle to consider cabling locations, thus increasing the degree of freedom of design.

Furthermore, according to the third embodiment above, the speaker units 2A to 2D are located in accordance with the seats of the vehicle 300 and by sending a radio signal including contents different from those for the other speaker units to the speaker unit corresponding to a specific seat, it is possible to allow individual passengers to listen to contents according to their preference.

Furthermore, the second and third embodiments above can reproduce contents with an optimal sound field according to the locations of the speaker units 2A to 2D.

Furthermore, the second and third embodiments above can generate a pseudo-silenced state or output sound stripped of a specific frequency component.

Furthermore, the second and third embodiments above allow the passenger seated on a specific seat to drive the speaker unit corresponding to the seat in a condition according to his/her preference, for example, set the speaker unit to only output sound that will not adversely affect the child in the case of a seat to which a child seat is attached.

Furthermore, in the second and third embodiments above, the audio unit 100A is made portable and can be carried into the vehicle, making it possible to transfer contents to be replayed to a plurality of speaker units via radio communication, eliminating a troublesome operation to transfer contents to the apparatus on the vehicle side, etc.

Furthermore, when a radio signal is sent, the second and third embodiments above send contents to be sent through the radio signal by dividing the contents by a predetermined unit amount of information to a plurality of speaker units. This makes it possible to efficiently send contents according to the time during which the frequency band available to radio communications can be occupied.

Furthermore, according to the second and third embodiments above, even if radio signals are sent from, for example, a stationary unit in the car cabin and a portable unit as the radio signals from the audio unit 100A, the same contents received from any one unit can be reproduced by a plurality of speaker units.

As many apparently widely different embodiments of the present invention can be made without departing from the spirit and scope thereof, it is to be understood that the invention is not limited to the specific embodiments thereof except as defined in the claims.

What is claimed is:

1. An audio system that reproduces contents information as sound in a vehicle, comprising:

a portable audio apparatus carried by a passenger of said vehicle; and an audio apparatus mounted in said vehicle, wherein said portable audio apparatus comprises
a storage medium for retaining contents information, and
a transmission module for transmitting said contents information to said audio apparatus at least by means of radio communication, wherein said audio apparatus comprises
a reception module for receiving said contents information from said portable audio apparatus at least by means of radio communication,
a control unit for reproducing said contents information received by said reception module and outputting the reproduced information as sound from a speaker mounted in said vehicle,
an operation switch that allows the passenger of said vehicle to input an operation of said audio system, and
an operation signal transmission module for transmitting an operation signal corresponding to the operation of said operation switch to said portable audio apparatus at least by means of radio communication, and wherein said portable audio apparatus further comprises a CPU for controlling operation of said portable audio apparatus according to said operation signal received from said audio apparatus at least by means of radio communication.

2. An audio system that reproduces contents information as sound in a vehicle, comprising:

a portable audio apparatus carried by a passenger of said vehicle; and an audio apparatus mounted in said vehicle, wherein said portable audio apparatus comprises
a storage medium for retaining contents information, and
a transmission module for transmitting said contents information to said audio apparatus at least by means of radio communication, wherein said audio apparatus comprises
a reception module for receiving said contents information from said portable audio apparatus at least by means of radio communication; and
a control unit for reproducing said contents information received by said reception module and outputting the reproduced information as sound from a speaker mounted in said vehicle, wherein said audio apparatus identifies said portable audio apparatus that exists in a predetermined radio communication area of said audio apparatus and further comprises a system construction unit for constructing a radio communication system made up of the identified portable audio apparatus and said audio apparatus, and said audio apparatus acquires said contents information from the portable audio apparatus identified by said system construction unit.

3. The audio system according to claim 2, wherein said audio apparatus further comprises a man-machine interface capable of, when a plurality of contents information pieces is received from a plurality of portable audio apparatuses identified by said system construction unit, instructing simultaneous reproduction of the plurality of contents information pieces, wherein said control unit, when simultaneous reproduction is instructed by said man-machine interface, outputs at least one contents information piece from among the plurality of contents information pieces whose simultaneous reproduction is instructed from said speaker and at the same time remotely controls said plurality of portable audio apparatuses so that the other contents information pieces are reproduced by at least any one of the plurality of portable audio apparatuses identified by said system construction unit.

4. The audio system according to claim 2, wherein said reception module can receive contents information from the plurality of portable audio apparatuses identified by said system construction unit, said audio apparatus further comprises a man-machine interface capable of, when a plurality of contents information pieces is received from the plurality of portable audio apparatuses identified by said system construction unit, setting priority of the plurality of portable audio apparatuses in order to set the order of reproducing those contents information pieces, and said control unit, when the priority is set by said man-machine interface, sequentially performs control that contents information received from one portable audio apparatus is output as sound from the speaker mounted in said vehicle on said identified plurality of portable audio apparatuses according to said priority.

5. The audio system according to claim 2, wherein said system construction unit, for the purpose of identifying said portable audio apparatuses detected in said vehicle, which is said predetermined radio communication area, assigns individual identification addresses and constructs said radio communication system with all portable audio apparatuses, which have been assigned identification addresses, and said audio apparatus.

6. The audio system according to claim 2, wherein said system construction unit transmits a first radio signal with directivity in said vehicle and identifies said portable audio apparatus that exists in said predetermined radio communication area based on a second radio signal received from said portable audio apparatus according to the transmission of the radio signal.

7. The audio system according to claim 6, wherein said predetermined radio communication area corresponds to a seat position placed in said vehicle.

8. The audio system according to claim 7, wherein said predetermined radio communication area corresponds to a position of the mount of said portable audio apparatus placed in said vehicle.

9. The audio system according to claim 6, wherein said system construction unit sends a first radio signal from a radio antenna installed almost in the center of said vehicle.

10. An audio apparatus for a vehicle mounted in a vehicle that reproduces contents information as sound in said vehicle, comprising:

a system construction unit for constructing a radio communication system constructed of a portable audio apparatus carried by a passenger of the vehicle and said audio apparatus;

a reception module for receiving said contents information from said portable audio apparatus at least by means of radio communication; and a control unit for reproducing said contents information received by said reception module and outputting the reproduced information as sound from a speaker mounted in said vehicle, wherein said system construction unit constructs, when a plurality of said portable audio apparatuses is identified, a radio communication system including the plurality of portable audio apparatuses, and said control unit, between said plurality of portable audio apparatuses, transfers contents information retained in a first portable audio apparatus to a second portable audio apparatus via radio communication and controls so that the contents information is reproduced as sound in said second portable audio apparatus.

11. An audio apparatus for a vehicle that reproduces contents information as sound in a vehicle comprising:

an audio control unit equipped with a first radio communication apparatus; and a plurality of speaker units equipped with a second radio communication apparatus, wherein said first and second radio communication apparatuses can carry out radio communications based on a predetermined radio communication protocol, said plurality of speaker units receives a radio signal sent from the first radio communication apparatus of said audio control unit by said second radio communication apparatus and reproduces contents information included in the received radio signal according to characteristic information individually set for each speaker unit, and said audio control unit can perform a setting by which said plurality of speaker units is divided into a plurality of groups made up of at least one speaker unit and sends a radio signal including contents information differing among the set plurality of groups.

12. The audio apparatus for a vehicle according claim 11, wherein said plurality of speaker units is provided in accordance with the seats in the vehicle, and said audio control unit sends to a speaker unit corresponding to a specific seat, a radio signal including contents information different from the contents information of the other speaker units.

13. An audio apparatus for a vehicle that reproduces contents information as sound in a vehicle comprising:

an audio control unit equipped with a first radio communication apparatus; and a plurality of speaker units equipped with a second radio communication apparatus, wherein said first and second radio communication apparatuses can carry out radio communications based on a predetermined radio communication protocol, said prurality of speaker units receives a radio signal sent from the first radio communication apparatus of said audio control unit by said second radio communication apparatus and reproduces contents information included in the received radio signal according to characteristic information individually set for each speaker unit, said audio control unit sends a first radio signal including the same contents information to said plurality of speaker units and sends a second radio signal including said characteristic information to each speaker unit individually, and said plurality of speaker units applies sound field processing based on individual characteristic information included in said second radio signal to the contents information included in said first radio signal and then outputs the contents information as sound.

14. The audio apparatus for a vehicle according to claim 13, wherein said characteristic information includes information on the locations of all said plurality of speaker units and sound field processing at those locations, and said plurality of speaker units performs sound field processing taking into account the other units based on said characteristic information prior to outputting sound from the own unit.

15. An audio apparatus for a vehicle that reproduces contents information as sound in a vehicle comprising:

an audio control unit equipped with a first radio communication apparatus; and a plurality of speaker units equipped with a second radio communication apparatus, wherein said first and second radio communication apparatuses can carry out radio communications based on a predetermined radio communication protocol, said plurality of speaker units receives a radio signal sent from the first radio communication apparatus of said audio control unit by said second radio communication apparatus and reproduces contents information included in the received radio signal according to characteristic information individually set for each speaker unit, said plurality of speaker units is provided in accordance with the seats in said vehicle, and said audio control unit controls a speaker unit from among said plurality of speaker units that corresponds to a specific seat so as to be able to reproduce sound with sound volume, sound quality or sound field different from the other speaker units.

16. The audio apparatus for a vehicle according to claim 15, wherein the seats in said vehicle are provided with a detection unit for detecting whether any child seat is attached, and said audio control unit designates a seat where said detection unit has detected the presence of a child seat as said specific seat and controls the speaker unit corresponding to the seat so as to be able to reproduce sound with sound volume, sound quality or sound field different from the other speaker units.

17. An audio apparatus for a vehicle that reproduces contents information as sound in a vehicle comprising:

an audio control unit equipped with a first radio communication apparatus; and a prurality of speaker units equipped with a second radio communication apparatus, wherein said first and second radio communication apparatuses can carry out radio communications based on a predetermined radio communication protocol, said plurality of speaker units receives a radio signal sent from the first radio communication apparatus of said audio control unit by said second radio communication apparatus and reproduces contents information included in the received radio signal according to characteristic information individually set for each speaker unit, and when a plurality of types of radio signals sent from different sources is received, said plurality of speaker units reproduces contents information included in any one of the radio signals based on preset priority.

18. A portable audio apparatus for a vehicle audio apparatus for a vehicle that reproduces contents information as sound in a vehicle, the vehicle apparatus comprising:

an audio control unit equipped with a first radio communication apparatus; and a plurality of speaker units equipped with a second radio communication apparatus, wherein said first and second radio communication apparatuses can carry out radio communications based on a predetermined radio communication protocol, said plurality of speaker units receives a radio signal sent from the first radio communication apparatus of said audio control unit by said second radio communication apparatus and reproduces contents information included in the received radio signal according to characteristic information individually set for each speaker unit, said portable audio apparatus comprising third radio communication apparatus that receives a radio signal sent from the first radio communication apparatus of said audio control unit, and wherein said portable audio apparatus can reproduce sound at least through a headphone based on the radio signal received by the third radio communication apparatus.

19. An audio apparatus for a vehicle, mounted in said vehicle, that reproduces contents information as sound in said vehicle, comprising:

a system construction unit constructing a radio communication system constructed of a portable audio apparatus carried by a passenger of the vehicle and said audio apparatus;

a reception module receiving said contents information from said portable audio apparatus at least by radio communication; and a control unit reproducing said contents information received by said reception module, and outputting the reproduced information as sound from a speaker mounted in said vehicle, wherein said system construction unit constructs the radio communication system at predetermined time intervals.

* * * * *

UNITED STATES PATENT AND TRADEMARK OFFICE
CERTIFICATE OF CORRECTION

PATENT NO. : 6,937,732 B2  Page 1 of 1
APPLICATION NO. : 09/825447
DATED : August 30, 2005
INVENTOR(S) : Hiroshi Ohmura et al.

It is certified that error appears in the above-identified patent and that said Letters Patent is hereby corrected as shown below:

Column 4, Line 56, delete "(10A)" and insert -- (100A) -- therefor.

Column 5, Line 62, delete "serve,to" and insert -- serve to -- therefor.

Column 14, Line 67, after "(Q15, Q16)" insert -- . --.

Column 15, Line 28, after "Thus" insert -- , --.

Column 26, Line 14, delete "10A" and insert -- 100A -- therefor.

Column 27, Line 24, after "used)" insert -- . --.

Column 31, Line 24, delete "10A" and insert -- 100A -- therefor.

Column 31, Line 45, delete "10A" and insert -- 100A -- therefor.

Column 38, Line 44, after "according" insert -- to --.

Column 38, Line 61, delete "prurality" and insert -- plurality -- therefor.

Column 39, Line 58, delete "prurality" and insert -- plurality -- therefor.

Column 40, Line 33, after "comprising" insert -- a --.

Signed and Sealed this

Fifth Day of December, 2006

JON W. DUDAS
*Director of the United States Patent and Trademark Office*